US012561155B2

(12) United States Patent
Barreto et al.

(10) Patent No.: US 12,561,155 B2
(45) Date of Patent: Feb. 24, 2026

(54) VIRTUAL CONTROLLER ARCHITECTURE AND SYSTEMS AND METHODS IMPLEMENTING SAME

(71) Applicant: Battelle Memorial Institute, Columbus, OH (US)

(72) Inventors: Giancarlo Canales Barreto, Dayton, OH (US); Nicholas L. Lamb, Upper Arlington, OH (US)

(73) Assignee: Battelle Memorial Institute, Columbus, OH (US)

( * ) Notice: Subject to any disclaimer, the term of this patent is extended or adjusted under 35 U.S.C. 154(b) by 885 days.

(21) Appl. No.: 17/562,632

(22) Filed: Dec. 27, 2021

(65) Prior Publication Data

US 2022/0253329 A1 Aug. 11, 2022

Related U.S. Application Data

(63) Continuation-in-part of application No. 17/542,903, filed on Dec. 6, 2021, now abandoned.

(60) Provisional application No. 63/122,731, filed on Dec. 8, 2020.

(51) Int. Cl.
*G06F 9/455* (2018.01)
*G06F 13/16* (2006.01)

(52) U.S. Cl.
CPC ...... *G06F 9/45558* (2013.01); *G06F 13/1694* (2013.01); *G06F 2009/45583* (2013.01); *G06F 2009/45595* (2013.01); *G06F 2213/0026* (2013.01)

(58) Field of Classification Search
CPC ............. G06F 9/45558; G06F 13/1694; G06F 2009/45583; G06F 2009/45595; G06F 2213/0026
See application file for complete search history.

(56) References Cited

U.S. PATENT DOCUMENTS 7,757,294 B1 * 7/2010 Simkins .................. G06F 21/10
726/26
2003/0036873 A1 * 2/2003 Sierer ................ G06Q 30/0601
702/123

(Continued)

*Primary Examiner* — April Y Blair
*Assistant Examiner* — Jonathan R Labud
(74) *Attorney, Agent, or Firm* — Grossman, Tucker, Perreault & Pfleger, PLLC; Donald J. Perreault

(57) ABSTRACT

An aspect of the present disclosure is directed to a system for dynamic provisioning of hardware instances via reprogrammable fabric provided by a reprogrammable hardware device (RHD). The system preferably includes a memory having a first instruction set disposed therein, the first instruction set for provisioning a hypervisor processing unit (HPU) instance (also referred to herein as an orchestrator instance) within the reprogrammable fabric of the RHD, and a startup sequence for execution by the HPU instance. The startup sequence of the HPU instance is preferably configured to cause provisioning of at least a first hardware instance within the second portion of the reprogrammable fabric of the RHD, and for provisioning an interface instance to allow for a physical hardware device of the host computer system to communicate with the first hardware instance via a virtualized communication channel.

29 Claims, 8 Drawing Sheets

(56)          References Cited

U.S. PATENT DOCUMENTS

| | | | | |
|---|---|---|---|---|
| 2009/0006659 A1* | 1/2009 | Collins | .................. | H04L 65/65 |
| | | | | 710/8 |
| 2009/0147945 A1* | 6/2009 | Doi | ........................ | H04L 9/002 |
| | | | | 380/2 |
| 2016/0224385 A1* | 8/2016 | Ichikawa | .................. | G06T 1/20 |
| 2019/0306134 A1* | 10/2019 | Shanbhogue | ......... | H04L 63/123 |
| 2021/0021475 A1* | 1/2021 | Barabash | ............ | H04L 41/0213 |
| 2021/0096895 A1* | 4/2021 | Reid | .................. | H04L 63/0428 |

* cited by examiner

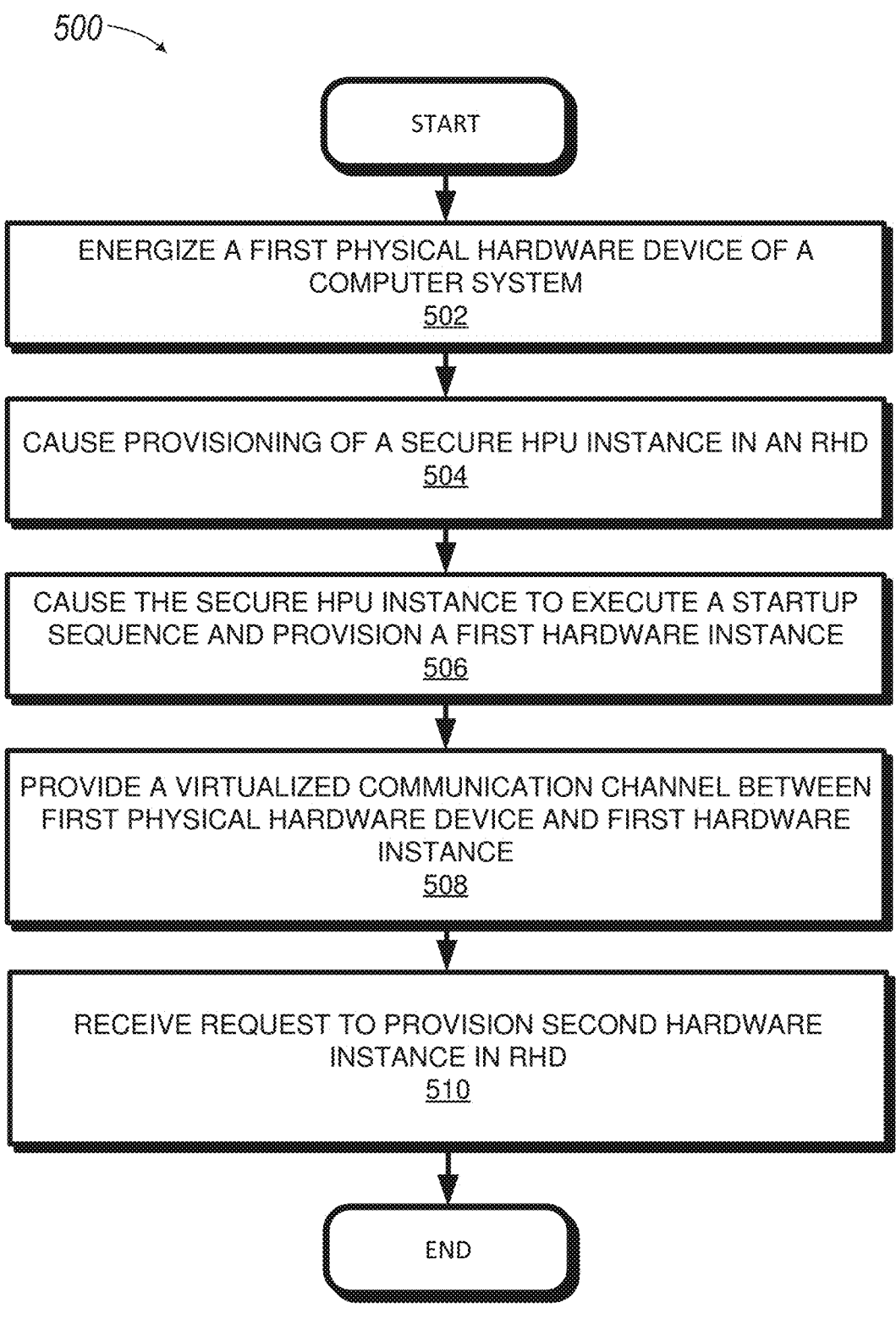

*500*

START

ENERGIZE A FIRST PHYSICAL HARDWARE DEVICE OF A
COMPUTER SYSTEM
502

CAUSE PROVISIONING OF A SECURE HPU INSTANCE IN AN RHD
504

CAUSE THE SECURE HPU INSTANCE TO EXECUTE A STARTUP
SEQUENCE AND PROVISION A FIRST HARDWARE INSTANCE
506

PROVIDE A VIRTUALIZED COMMUNICATION CHANNEL BETWEEN
FIRST PHYSICAL HARDWARE DEVICE AND FIRST HARDWARE
INSTANCE
508

RECEIVE REQUEST TO PROVISION SECOND HARDWARE
INSTANCE IN RHD
510

END

FIG. 5

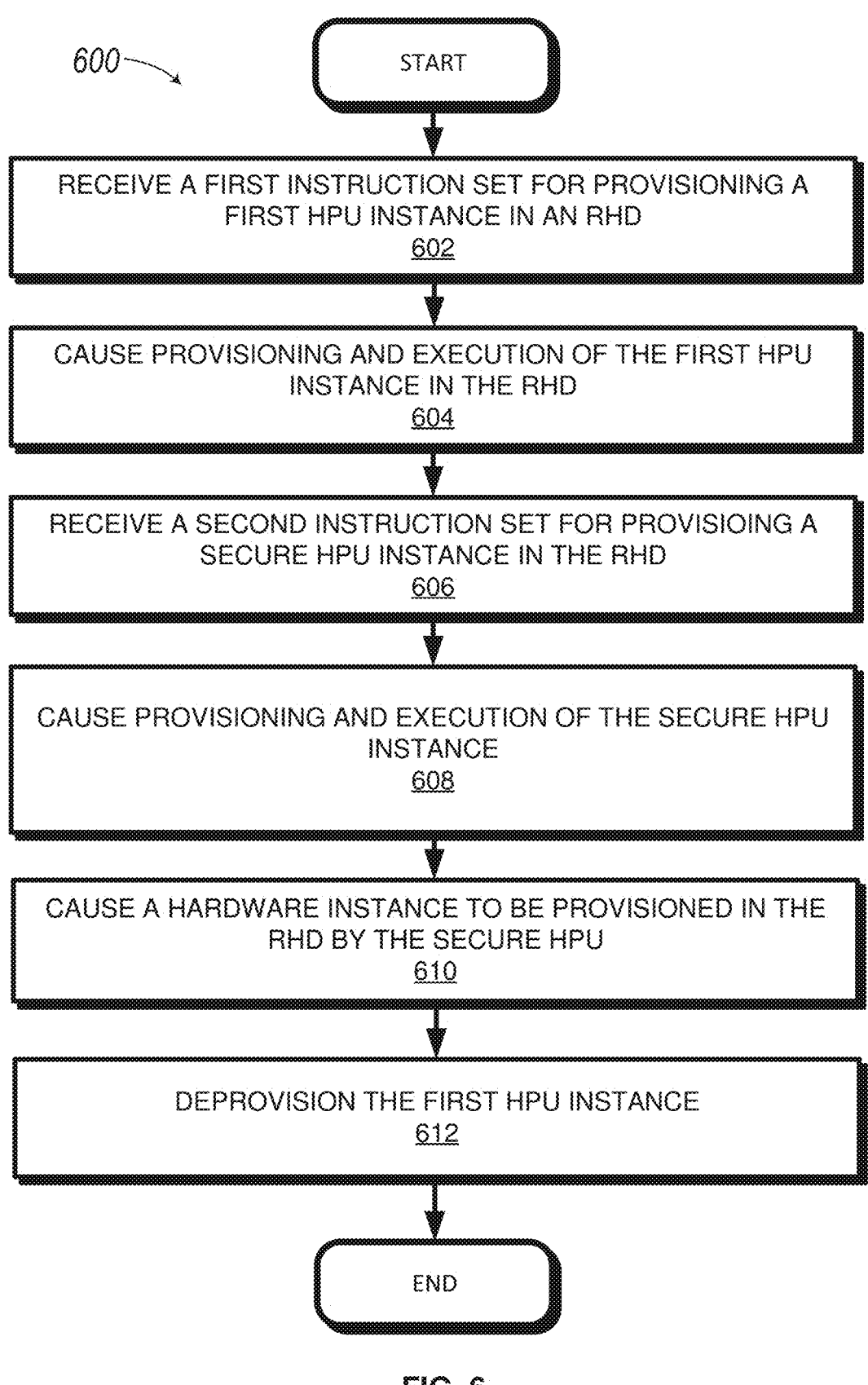

*600*

START

RECEIVE A FIRST INSTRUCTION SET FOR PROVISIONING A
FIRST HPU INSTANCE IN AN RHD
602

CAUSE PROVISIONING AND EXECUTION OF THE FIRST HPU
INSTANCE IN THE RHD
604

RECEIVE A SECOND INSTRUCTION SET FOR PROVISIOING A
SECURE HPU INSTANCE IN THE RHD
606

CAUSE PROVISIONING AND EXECUTION OF THE SECURE HPU
INSTANCE
608

CAUSE A HARDWARE INSTANCE TO BE PROVISIONED IN THE
RHD BY THE SECURE HPU
610

DEPROVISION THE FIRST HPU INSTANCE
612

END

VIRTUAL CONTROLLER ARCHITECTURE AND SYSTEMS AND METHODS IMPLEMENTING SAME

RELATED APPLICATIONS

This application is a Continuation in Part of U.S. patent application Ser. No. 17/542,903, filed on Dec. 6, 2021, which claims benefit of U.S. Provisional Patent Application Ser. No. 63/122,731, filed on Dec. 8, 2020, both of which are fully incorporated herein by reference.

TECHNICAL FIELD

The following disclosure relates generally to virtualized environments for computer systems, and more particularly, dynamic provisioning of hardware instances via reprogrammable hardware devices (RHDs) to provide dedicated hardware for virtualized environments.

BACKGROUND

Virtualization allows users to create and run multiple operating environments within a single, physical hardware system. Each operating environment, e.g., each Virtual Machine (VM), can run its own operating system and various applications independent from other VMs. Each VM can emulate a physical computer, and more particularly physical hardware devices that comprise a computer, by creating a separate/isolated operating system environment from that of other VMs. In short, in a virtual environment, one physical computer device/system can be logically divided into multiple different and distinct VMs. Software called a hypervisor can connect directly to the physical hardware devices/components and allows the computer device to be split into the multiple VMs. The hypervisor can allocate computing resources (e.g., processing power, RAM, storage, etc.) to each VM, thus giving each VM the resources to execute their desired applications. FIGS. 1 and 2 illustrate existing virtual environment configurations.

Like many computer systems, hypervisors are susceptible to security breaches. For example, hardware-based Row-hammer principles can be used to attack DDR3 memory utilizing error-correction codes (ECC) as well as newer DDR4 memory. Hypervisors are also susceptible to memory leaks through the Spectre and Meltdown speculative execution hardware faults. These three major variants allow a guest to bypass bounds checking, perform branch target predictions, and load rogue cache data. These variants can also use timing techniques that "rig" the main CPU to enter an unsafe state, which allows attackers to exploit the many security vulnerabilities of the hypervisor. It should be understood that the above is a non-exhaustive list of the various types of security breaches that may occur in a hypervisor by unprivileged software in order to attack system resources.

Furthermore, collusion between guests (i.e., users) may cause security breaches within the virtual environment. A fundamental tenant of hypervisor isolation is that guests should not be able to communicate with each other without going through specific, often dedicated, access mechanisms. However, guests can use timing and other messaging methods to allow communication or leakages with respect to other guests. These techniques allow the stealing of data from one or more unwitting guests.

There exists a need to provide increased security within virtualized computer environments while maintaining nominal performance and power efficiency targets.

BRIEF DESCRIPTION OF THE DRAWINGS

In the drawings, identical reference numbers identify similar elements or acts. The sizes and relative positions of elements in the drawings are not necessarily drawn to scale. For example, the shapes of various elements and angles are not drawn to scale, and some of these elements are enlarged and positioned to improve drawing legibility. Further, the particular shapes of the elements as drawn are not intended to convey any information regarding the actual shape of the particular elements, and have been solely selected for ease of recognition in the drawings.]

FIG. 5 shows an example process for provisioning of hardware instances within reprogrammable fabric of an RHD, in accordance with aspects of the present disclosure.

FIG. 6 shows an example process for provisioning and executing a secure HPU instance within reprogrammable fabric of an RHD, in accordance with aspects of the present disclosure.

FIG. 7A shows another example process/method consistent with aspects of the present disclosure.

FIG. 7B shows another example process/method consistent with aspects of the present disclosure.

FIG. 8A shows another example process/method consistent with aspects of the present disclosure.

FIG. 8B shows another example process/method consistent with aspects of the present disclosure.

DETAILED DESCRIPTION

Figure 1:
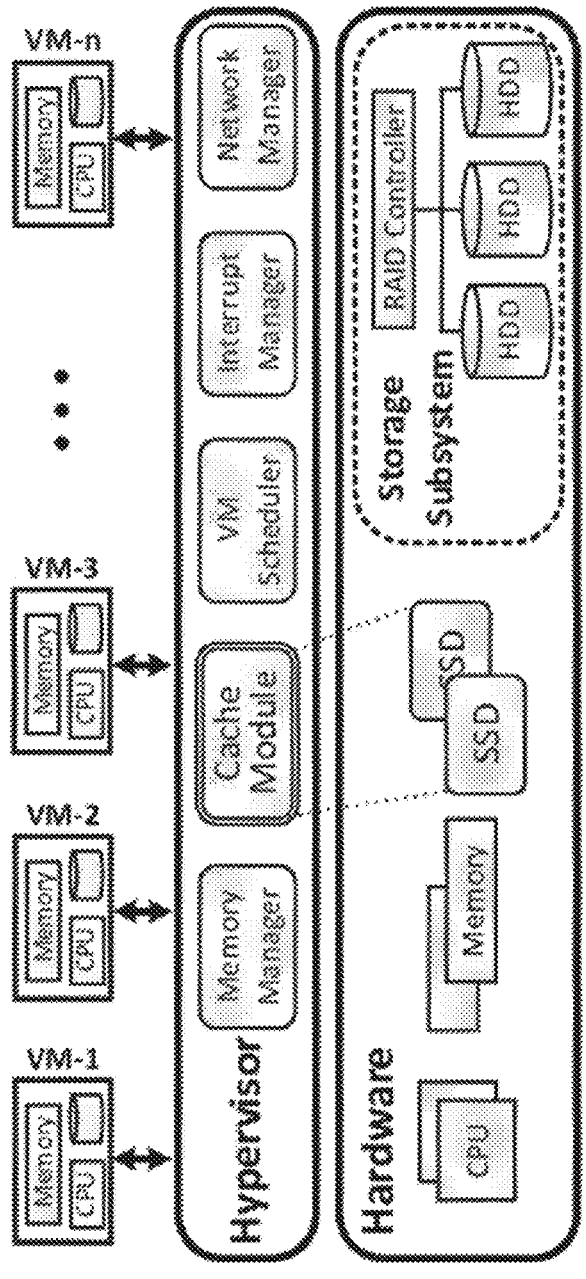
FIG. 1 shows an example of a virtual computer environment.
Figure 2:
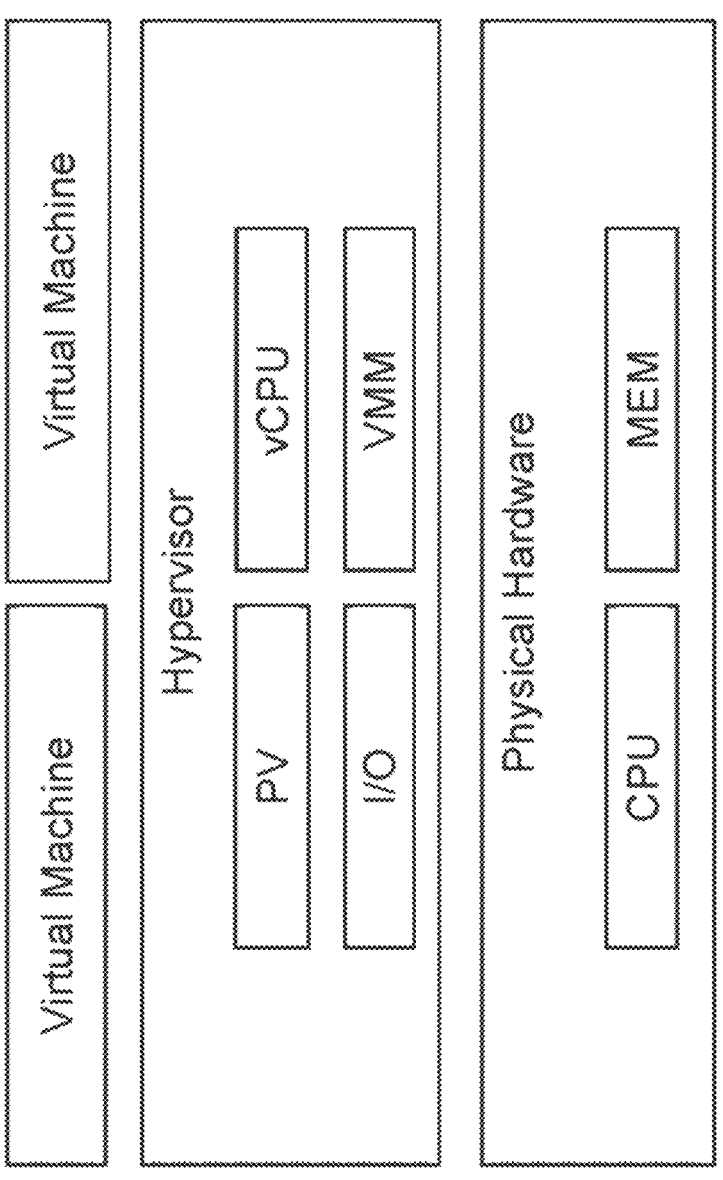
FIG. 2 shows another example of a virtual computer environment.

In general, the present disclosure is directed to systems and methods of dynamic provisioning of hardware instances via reprogrammable fabric provided by reconfigurable hardware devices (RHDs). The hardware instances provisioned within the reprogrammable fabric can be associated to collectively provide a virtual machine, also referred to herein as a virtual environment or a guest. The virtual machine provided by hardware instances consistent with the present disclosure may also be referred to herein as a RHD-deployed virtual environment. Preferably, the system includes a hypervisor processing unit (HPU) instance that is at least partially provisioned within the reprogrammable fabric of an RHD. The HPU instance may also be referred to herein as a secure HPU instance, a secure HPU, a HPU, a secure orchestrator instance, an orchestrator instance, or simply an orchestrator. More preferably, the HPU instance is entirely implemented within the reprogrammable fabric of the RHD. Implementing the HPU instance entirely within the reprogrammable fabric of the RHD or otherwise in dedicated hardware that is separate/isolated from the host/main computer device) advantageously allows for isolation between the primary execution environment (e.g., the computer device implementing the RHD, and the primary operating system of the computer device) and the RHD to minimize or otherwise reduce the potential for security breaches.

In one specific non-limiting example, a system for dynamic provisioning of hardware instances via reprogrammable fabric provided by a RHD is disclosed. The system preferably includes a memory having a first instruction set disposed therein, the first instruction set for provisioning an HPU instance (also referred to herein as an orchestrator instance) within a first portion of the reprogrammable fabric of the RHD, and a startup sequence for execution by the HPU instance. The startup sequence of the HPU instance is preferably configured to cause provisioning of at least a first hardware instance within the second portion of the reprogrammable fabric of the RHD, and for provisioning an interface instance to allow for a physical hardware device of the host computer system to communicate with the first hardware instance via a virtualized communication channel.

The term hardware instance as used herein refers to a component/device that is implemented at least in part within reprogrammable fabric of an RHD. Such hardware instances may also be referred to as virtualized hardware instances. However, unlike existing virtualized hardware instances that emulate devices such as network interface circuits via software, hardware instances consistent with the present disclosure are implemented as dedicated hardware devices that are provisioned by application/programming of an instruction set to an RHD. Accordingly, the term hardware instance as used herein refers to a portion of programmable fabric of an RHD that has been provisioned via a corresponding instruction set. For example, one example of an RHD suitable for provisioning hardware instances consistent with the present disclosure includes a field programmable gate array (FPGA). In this example, the instruction set for provisioning a given hardware instance within the reprogrammable fabric of the FPGA can be a FPGA bitstream.

Thus, a hardware instance consistent with the present disclosure can advantageously be provisioned as dedicated hardware within an RHD and provide performance that can be equal to an equivalent physical hardware device. Thus, RHD-deployed virtual environments that are collectively provided by one or more hardware instances of the present disclosure can provide significant performance improvements over existing virtual environments that generally emulate hardware through software.

In addition, RHD-deployed virtual environments consistent with the present disclosure advantageously allow for hardware instances to be dynamically provisioned and de-provisioned by an HPU instance to correct for abnormal conditions such as component failure through remedial action. Some such remedial actions can include provisioning replacement hardware instances to replace faulty/degraded hardware instances, and/or faulty/degraded physical hardware devices that are not necessarily implemented via reprogrammable fabric of an RHD. In some cases, the remedial action can occur in a so-called "hot swap" manner whereby a replacement hardware instance can be provisioned and used to replace a faulty/degraded hardware instance or physical hardware device. In one example, this includes rerouting a virtual communication channel to a replacement hardware instance such that a physical hardware device can communicate with the replacement hardware instance without necessarily recognizing/detecting that the change/hot-swap occurred. In other cases, the remedial action such as a cold swap can occur and the associated RHD-deployed virtual environment can be reset/rebooted to resume operation with the replacement hardware instance.

Thus, various aspects and features of the present disclosure can minimize or otherwise reduce the various aforementioned security breaches as well as other undocumented (e.g., zero-day) vulnerabilities that may be identified over time.

For example, an HPU instance consistent with the present disclosure can detect erroneous guest activity, such as those associated with Rowhammer-style guest behaviors, and trigger mitigations/remedial action that can allow for the resumption of the offending guest without allowing for successful exploitation of the vulnerability. As used herein, a guest activity refers to logic and/or code that can be executed by one or more hardware instances consistent with the present disclosure. Such guest activity can be authorized/privileged yet still be identified as erroneous or abnormal by an HPU instance consistent with the present disclosure.

Such logic and/or code can be executed by a RHD-deployed virtual environment based on, for instance, a user providing input to a user interface in the form of mouse clicks, keyboard presses, execution of applications, and so on. The HPU instance can provide a monitoring system that can observe second order effects (e.g., performance counters) associated with the RHD-deployed virtual environment, and more particularly the hardware instances that provide an equivalent of physical hardware devices within the RHD-deployed virtual environment such as a main central processing unit (CPU), peripherals, and/or supporting devices and circuitry (e.g. memory, graphics processing unit, etc.). The HPU instance may then detect abnormal patterns based on such observed second order effects. When these second-order effects are captured and processed by the HPU instance, the HPU instance can distinguish normal patterns from abnormal patterns using, for instance, machine learning, heuristics, and/or other suitable approaches. In the event of a detected abnormality, the HPU instance can cause remedial actions to occur such as such as periodically rescheduling the guest process(es) to nullify the timing results, inject faulty timing values to throw off the analysis upon which attacks are based, suspend the offending guest for forensics analysis, and/or take other actions.

Figure 3:
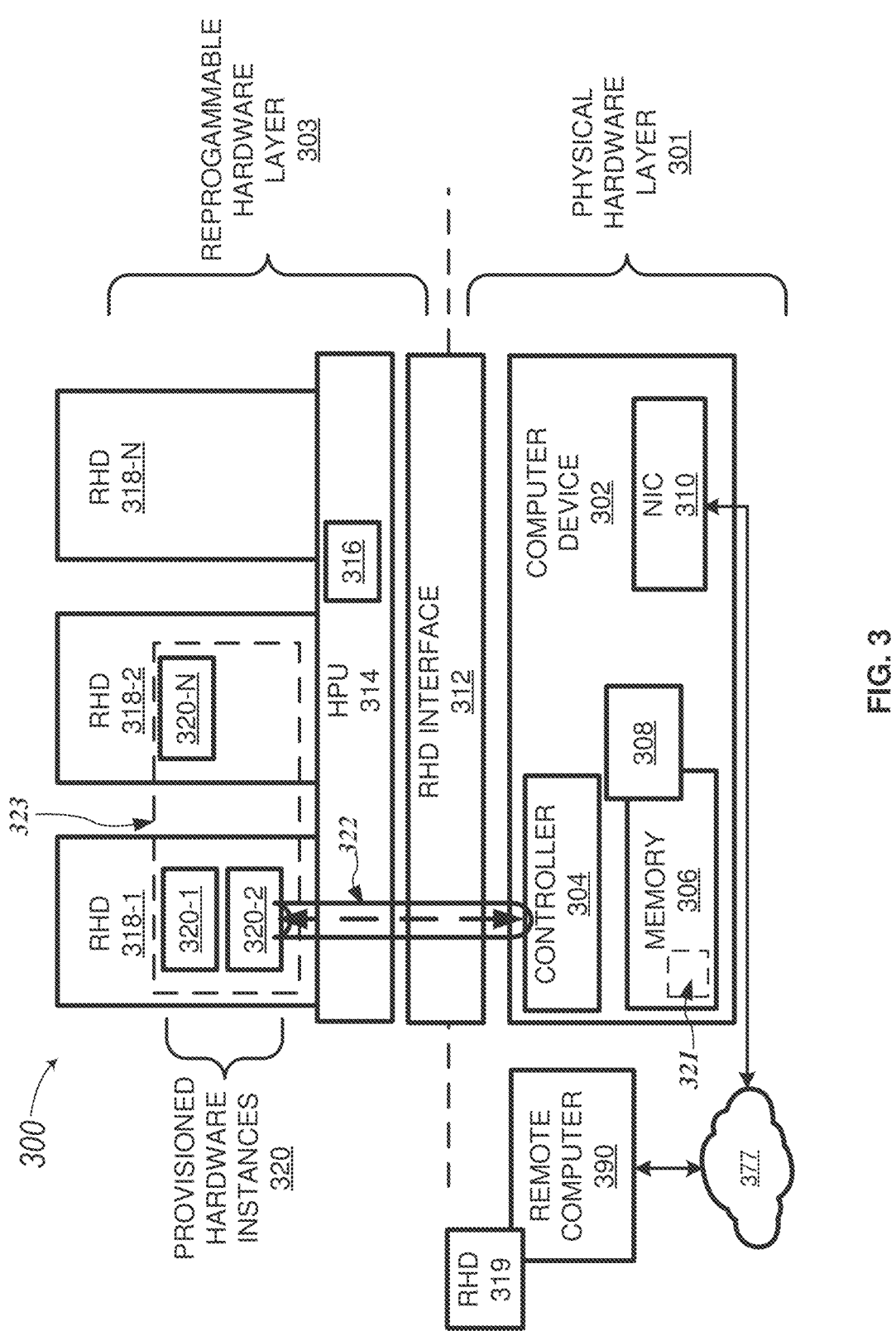
FIG. 3 shows an example system for dynamic provisioning of hardware instances within reprogrammable fabric of a reconfigurable hardware device (RHD), in accordance with aspects of the present disclosure.

FIG. 3 shows an example system 300 consistent with aspects of the present disclosure. As shown, the system 300 preferably includes a physical hardware layer 301 and a reprogrammable hardware layer 303.

The physical hardware layer 301 is preferably implemented by at least one computer device, such as the computer device 302. The computer device 302 can be implemented as, for example, a server computer, desktop computer, or a laptop computer. However, other computer devices are within the scope of this disclosure such as vehicle control systems, aviation control systems, spaceship control systems, and so on. As shown, the computer device 302 preferably includes a controller 304, a memory 306, and an optional network interface circuit (NIC) 310. The computer device 302 may also be referred to herein as a host computer system.

The controller 304 is preferably implemented as at least one processing device/circuit such as, for example, a digital signal processor (DSP), a field-programmable gate array (FPGA), Reduced Instruction Set Computer (RISC) processor, x86 instruction set processor, microcontroller, and/or an application-specific integrated circuit (ASIC). The controller 304 can comprise a single chip, or multiple separate chips/circuitry. As discussed further below, the controller 304 can be configured to execute processes consistent with the present disclosure using software (e.g., C or C++ executing on the controller 304), hardware (e.g., circuitry, hardcoded gate level logic or purpose-built silicon) or firmware (e.g., embedded routines executing on a microcontroller), or any combination thereof. In one preferred example, the controller 304 is configured to execute and carry out at least a portion of the processes/methods of FIGS. 5-8B.

The memory 306 can comprise volatile and/or non-volatile memory devices. The memory 306 preferably includes at least a first instruction set 321 disposed therein. The first instruction set 321 is preferably configured to provision a hardware instance consistent with the present disclosure within the reprogrammable hardware layer 303.

The first instruction set 321 can be implemented as a field programmable gate array (FPGA) bitstream. The first instruction set 321 is preferably configured to provision a portion of the programmable fabric of an RHD to deploy an associated hardware instance. For example, the first instructions set 321 can include a definition of hardware logic, routing, and parameters such as an initial value for off-chip registers and on-chip memory such as logic blocks.

In the context of an FPGA, for example, the logic blocks can be implemented via lookup tables (LUTs) and gates, e.g., flip flops. Thus, the first instruction set 321 preferably includes at least one parameter for initial configuration, e.g., for memory and/or logic block configuration, and at least one startup sequence for transitioning a hardware instance from an initialization state to a operational state. The operational state may also be referred to herein as an energized state. The energized state can be understood as analogous to the state a physical hardware device enters when energized/powered-on.

More preferably, the memory 306 includes a plurality of instruction sets disposed therein including the first instruction set 321. Each instruction set of the plurality of instructions sets can be configured to provision a hardware instance within the reprogrammable hardware layer 303. The plurality of instruction sets can provision such hardware instances within the reprogrammable hardware layer 303 to function as an equivalent physical hardware device. Some such examples of hardware devices that can be provisioned within the reprogrammable hardware layer 303 include a network interface controller, a hard drive controller, a graphics adapter, an analog-to-digital converter, a central processing unit, and/or other devices/chips.

Alternatively, or in addition, the plurality of instruction sets can provision proprietary hardware instances that do not necessarily have an equivalent in physical hardware. For example, the first instruction set 321 may be configured to provision a hypervisor processing unit (HPU) 314, as discussed in further detail below.

The memory 306 preferably further includes a secure memory device 308. The secure memory device 308 can be implemented as a trusted platform module (TPM), for example. In one example, at least one instruction set such as the first instructions set 321 may be disposed at least partially in the secure memory device 308. As discussed in further detail below, an instruction set disposed within the secure memory device 308 can be utilized during a startup sequence that includes provisioning of the HPU instance 314, and more preferably, provisioning of the HPU instance 314 and at least one hardware instance.

The NIC 310 can comprise one or more circuits for communicating with a computer network, such as the network 377. In one example, the NIC 310 is an Ethernet network controller that communicates via the computer network using a protocol that comports with the IEEE 802.3 standard. The NIC 310 can be configured for wired and/or wireless communication with the computer network.

The physical hardware layer 301 further preferably couples to the reprogrammable hardware layer 303 via a reconfigurable hardware device (RHD) interface 312. The RHD interface 312 further preferably communicatively couples to one or more RHD devices, e.g., RHD 318-1, RHD 318-2, RHD 318-N. The RHD interface 312 can be utilized for provisioning of hardware instances within the reprogrammable hardware layer 303 based on instruction sets, e.g., the first instruction set 321.

In one example, the RHD interface 312 implements provisioning of hardware instances within the reprogrammable hardware layer 303 through an interrupt that is similar/equivalent to a hardware interrupt. In this example, the hardware interrupt preferably triggers/causes the RHD 318-1 to perform a desired action, such as loading an instruction set into memory, unloading an instruction set from memory, or energizing the hardware circuitry of an RHD (and thus by extension energizing one or more hardware instances).

In another example, the RHD interface 312 accesses and writes to a memory exposed by an RHD, e.g., the RHD 318-1. The memory exposed by the RHD can be a Flash-type memory chip, for example. More preferably, the memory exposed by the RHD is dedicated to the RHD and can only be written to by the RHD interface 312. In any event, the RHD can poll at a predetermined interval (e.g., using internal initiation) the exposed memory to detect an update/change. The change to the exposed memory can include an update to a configuration files stored therein and/or writing of an instruction set to the exposed memory.

The RHD may then execute an action based on the detected change to the exposed memory. Some such example actions can include loading or unloading an instruction set into memory. Other examples of triggering an RHD to instantiate/load an instruction set can include uni-directional (e.g., pushing) or bi-directional communications. The RHD may then use the loaded/instantiated instruction set for provisioning of a hardware instance consistent with the present disclosure. In the context of the reprogrammable hardware layer 303 being provided by at least one FPGA, the RHD interface 312 may therefore apply provisioning using an instruction set in the form of an FPGA bitstream.

The RHD interface 312 can further provide a communication bus that allows for components/physical hardware within the physical hardware layer 301 to communicate with the one or more RHD devices. In one non-limiting example, the RHD interface 312 is at least partially implemented as a Peripheral Component Interconnect Express (PCIe) bus that provides at least one PCIe slot for electrically coupling to an RHD device (e.g., implemented on a PCIe card).

In one example, the computer device 302 may be configured to provide remote access to one or more RHD devices. In this example, a remote computer device 390 can be configured to communicate with the computer device 302 via NIC 310. The remote computer device 390 may then send requests to the computer device 302 via NIC 310 to cause execution of operations on one or more RHDs local to the computer device 302, e.g., RHD 318-1 to 318-N, as discussed in further detail below.

For ease of description, the following aspects and features are described with reference to a single computer device, e.g., computer device 302, and one or more local/co-located RHD devices, e.g., RHDs 318-1 to 318-N. However, this disclosure is not limited in this regard, and an RHD device can be local to the RHD interface 312, e.g., co-located in the same computer server, or may be remote. For example, one or more of the RHD devices may be remotely accessible via a network, such as described in the example above, and may be accessed by the RHD interface 312 over the network, e.g., network 377.

Accordingly, in one example, the reprogrammable hardware layer 303 can be provided collectively by N number of computer devices within the physical hardware layer 301 and their associated RHD device(s). In one example, the reprogrammable hardware layer 303 operates as a fabric whereby RHDs from two or more computer devices communicatively coupled to the network 377 can be logically associated and appear as a single device/system. A hardware instance consistent with the present disclosure, such as a system-on-chip (SoC), may then be virtually deployed/provisioned within the programmable fabric of RHDs provided by multiple different computer systems.

By way of example, consider a scenario where a plurality of hardware instances including a processor (e.g., an x86 processor), a cryptographic chip, and a real-time clock chip are provisioned via the reprogrammable hardware layer 303 and collectively provide a single virtualized computer environment (or guest). In this example, the plurality of hardware instances can be implemented via a single RHD, e.g., RHD 318-1, or via a plurality of RHDs, with the plurality of RHDs being provided by a single computer device (e.g., computer device 302) or a plurality of different computer devices.

Further logical partitioning can be utilized to enable multi-tenant (or multi-guest) support, whereby each RHD within the reprogrammable hardware layer 303 can be used by two or more different guests/tenants, such as in a cloud computing environment. In this example, the HPU instance 314 can be utilized to ensure that first and second hardware instances owned by two different tenant/entities that happen to be implemented within a common RHD are isolated such that the first hardware instance cannot access memory of the second hardware instance, and vice-versa.

Continuing on, each RHD devices within the reprogrammable hardware layer 303 preferably includes reprogrammable fabric that allows for the dynamic provisioning of hardware instances consistent with the present disclosure. Some such example RHDs include field programmable gate arrays (FPGAs) and complex programmable logic devices (CPLDs). It should also be noted that various aspects and features of the present disclosure can be implemented in other devices/hardware that are not necessarily reprogrammable such as application-specific integrated circuits (ASICs). For example, an HPU instance consistent with the present disclosure may be implemented whole, or in part, within such non-programmable hardware.

The reprogrammable hardware layer 303 is preferably configured to implement a plurality of provisioned hardware instances 320 via the RHDs. Each of the plurality of provisioned hardware instances 320 may be referred to herein as dynamically provisioned hardware instances or simply hardware instances. Each hardware instance can be configured to provide the functionality and performance of an equivalent device when implemented in physical hardware. For example, the first hardware instance 320-1 can be provisioned as an x86 processor and provide an identical instruction set to that of an x86 processor implemented as a physical hardware device, e.g., within dedicated silicon, such as controller 304. Alternatively, the first hardware instance 320-1 can be provisioned as a proprietary processor/controller. For instance, the first hardware instance 320-1 maybe provisioned to provide the processing resources (e.g., processor cycles, memory, registers) to implement a HPU instance consistent with the present disclosure. The provisioned hardware instances 320 can be associated to provide one or a plurality of RHD-deployed virtual environments, such as the RHD-deployed virtual environment 323. As shown, the RHD-deployed environment 323 can be provided by hardware instances, e.g., hardware instances 320-1, 320-2 and 320-N, deployed on two or more different RHDs.

The HPU instance can be configured to cause the dynamic provisioning and/or de-provisioning of hardware instances consistent with the present disclosure. The HPU instance can be further configured to manage and supervise each RHD-deployed virtual environment. In one example, the HPU instance is configured to cause the association and/or de-association of hardware instances to create, modify, and/or remove RHD-deployed virtual environments. More preferably, the HPU instance is further configured to manage a state of the RHD-deployed virtual environments and be configured to transition the same between power-off and power-on states at a system level, e.g., for all hardware instances associated with a given RHD-deployed virtual environment, and/or at a component/hardware instance level.

One such example HPU instance is shown as HPU instance 314 in FIG. 3. The HPU instance 314 may also be referred to herein as a secure HPU instance, a secure orchestrator instance, or simply an orchestrator instance. One example process for provisioning and executing such a secure HPU instance during initialization of a computer device is shown and discussed further below with regard to FIG. 5.

In one example, the HPU includes a para-virtualization (PV) handler, virtual central processing unit (vCPU), enhanced input/output controller (I/O+), and/or enhanced virtual machine monitor (VMM+).

In one example, the HPU instance 314 can be configured to monitor memory access between the plurality of provisioned hardware instances and detect a memory access anomaly. The HPU instance 314 can be configured to perform a remedial action based on the detected memory access anomaly. In this scenario, the HPU instance 314 may interject itself into the execution flow an perform a hardware-level mitigation such as flushing a data cache entry, and/or pre-fetching and filtering an instruction cache associated with the detected access anomaly.

Flushing mechanisms, which can prevent an attacker from carrying out its attack, may be achieved by having the HPU instance 314 call/execute one or more built-in instructions provided by one or more CPUs of a RHD-deployed virtual environment (or RHD-deployed guest). For example, the first hardware instance 320-1 may be a main CPU for the RHD-deployed virtual environment 323, and the HPU instance 314 may execute such a built-in instruction using this hardware instance.

Such built-in instructions can cause execution of flushing operations. For example, Intel Corporation has the CLFLUSH and WBINVD instructions to perform certain flushing operations.

Furthermore, cache flushing does not compromise/interrupt the guest or otherwise prevent execution thus enabling applications such as mission critical systems/environments to maintain intended/required uptime.

In addition, because the operating system and microcode patches to a system may be costly in terms of money, performance, and time, the HPU instance 314 may inline-process a similar patch and run it within the dedicated hardware resources of the HPU instance 314 without necessarily degrading overall performance of the guest operating system. For example, the HPU instance 314 can apply a modified (or patched) first hardware instance 320-1 within the same RHD, e.g., RHD 318-1, or within a different RHD such as RHD 318-N. Once the inline patch has been applied, the first hardware instance 320-1 can execute the updated hardware without necessarily utilizing an intermediate instruction pre-processor (e.g., a "shim" or "microcode"). Microcode and similar inline hardware instruction patch mechanisms can have a significant overhead cost which can be advantageously eliminated by an HPU instance consistent with the present disclosure.

Further, the HPU instance 314 can protect against guest break-out techniques, such as the one demonstrated against VMware's ESXi products (CVE-2018-6981, CVE-2018-6982). In this scenario, the attacker may use memory leaks to determine areas inside the VMware ESXi kernel (VMK) to attack the system using uninitialized stack variables. To prevent this, the HPU instance 314 may be used to detect whether a guest has addresses that coincide with the VMK and prevent associated abuses. This is possible because the HPU instance 314 can observe both the physical and virtual variants of the main system's kernel (e.g., the kernel of the computer device 302) and protected memory regions as well as those of the guests. In addition, the HPU instance 314 can execute out of band from the main CPU (e.g., controller 304 of FIG. 3) and thus can introspect into the guest hypervisor and the guest hypervisor's guests (i.e., nested guests).

The HPU instance 314 may also be configured to detect odd/abnormal sequences of instructions and/or data accesses between various guests that have overlapping instructions or memory regions. Upon detection, the HPU instance 314 may introduce noise that would eliminate the utility of these vectors while not requiring patching of the physical devices of the main system, such as the computer device 302, or any guests thereof.

The HPU instance 314 may also be used to provide added security against architectural flaws in physical hardware devices of the host computer device.

Virtual interfaces are particularly well suited for demonstrating how the HPU instance 314 can enhance security and performance and reduce overall power consumption. Examples of virtual interfaces include network devices, SATA controllers, and graphics processing units (GPUs). Virtual interfaces are generally programmed using C and Assembly. In one example, when a guest attempts to use a virtual interface, a traditional/legacy hypervisor (i.e. the host) interrupts the guest and begins to emulate the functionality of the interface and resumes the guest once the emulation completes. This process typically takes many clock cycles (on the order of 20,000 or more) and significantly slows down the guest while also increasing the likelihood of programming errors that may compromise the entire virtual environment.

In contrast, the HPU instance 314 can intercept the virtual network interface operation and process it via one or more of the provisioned hardware instances 320. The HPU instance 314 can dispatch the operation to a dedicated hardware handler provided by one or more of the provisioned hardware instances 320. Thus, instead of executing many lines of code in translated instruction sequences within the kernel on the main CPU, e.g., controller 304, the HPU instance 314 can instantaneously process the request as if it were a "real" network interface within the reprogrammable hardware layer 303, which may also be referred to herein as an HPU-isolated environment.

Accordingly, in this example, errors that would normally impact the hypervisor software or underlying hardware are eliminated or otherwise reduced. Moreover, a HPU consistent with the present disclosure is effectively impervious to attacks that target the main CPU, e.g., controller 304, and similarly attacks that attempt to attack an HPU are unlikely to be applicable as an attack against the system's main CPU. Accordingly, this configuration provides hardware-enforced mutual protection against attacks.

In practice, the HPU instance 314 may be implemented in a wide range of forms. In one example, the HPU instance 314 can be implemented as a PCI Express card or a system-on-chip. More preferably, the HPU instance 314 is implemented at least in part via reprogrammable fabric of an RHD after startup/initialization of a computer device. One such example process for provisioning the HPU instance 314 following startup/bootup of a computer device is discussed further below with regard to FIGS. 5-8B.

Thus, the remedial action executed by the HPU instance 314 in response to a detected anomaly can include preventing a memory access to occur (e.g., via flushing and prefetching as discussed above), disabling a hardware instance that the detected memory access anomaly originated from, and/or outputting a message to the physical hardware device and/or to a remote computer server that includes an identifier of the detected memory access anomaly.

In one example, additional remedial actions can include disabling of a hardware instance such that communication with an associated physical hardware device via the virtual communication is prevented, and/or provisioning a replacement hardware instance within the programmable fabric of the RHD and rerouting an associated virtual communication channel to the second hardware instance.

The HPU instance 314 can be further configured to provide a virtual communication channel 322. The virtual communication channel 322 can be used to allow for communication between hardware instances provisioned in the reprogrammable hardware layer 303 and physical hardware within the physical hardware layer 301. The virtual communication channel 322 is preferably bidirectional to allow for a hardware instance to communicate with physical hardware device(s) and vice-versa. The virtual communication channel 322 may be configured for 1:1 communication between a single hardware instance and a single physical hardware device, N:1 communication between N hardware instances and a single physical hardware device, 1:N communication between a single hardware instance and N physical hardware devices, or N:N communication between N hardware instances and N physical hardware devices. Note, a plurality of such virtual communication channels can be provisioned/formed for each RHD-deployed virtual environment, with each of the virtual communication channels being configured for 1:1, N:1, 1:N, and/or N:N communication as described above. As discussed below, each virtual communication channel can be configured to emulate a target communication bus such as PCIe busses.

In the example of FIG. 3, the virtual communication channel 322 is configured to allow for the controller 304 to communicate (e.g., bidirectionally) with the second hardware instance 320-2. In this example, the second hardware instance 320-2 can be implemented as a cryptographic module (e.g., a random number generator), a graphics processing unit (GPU), or a processor (such as an x86 processor). More preferably, the second hardware instance 320-2 is a virtual system-on-chip (vSoC). The virtual communication channel 322 preferably provides a communication bus/path that is equivalent to a bus used to connect the physical hardware equivalent of the second hardware instance 320-2 to the controller 304. For example, and in the context of the hardware instance 320-2 being implemented as a GPU, the virtual communication channel 322 can comport with the PCIe standard such that the controller 304 "sees" the second hardware instances 320-2 as a PCIe-compatible physical hardware device based on the virtual communication channel 322 providing PCIe-compatible timing and electrical signaling.

As discussed in greater detail below, the virtual communication channel 322 can be dynamically initiated and configured during operation/execution of the HPU instance 314.

The HPU instance 314 can enable on or more processor extensions 316 via reconfiguration/provisioning of the RHD 318-1. The HPU instance 314 may intercept (or "trap") any portion of instructions such as fetch, decode, and execute, and redirect the state to RHD 318-1, for example. This can allow a software systems development team to engineer new/updated instructions post manufacturing. Since the HPU instance 314 can intercept instructions, the HPU instance 314 can be configured to implement the processor extensions 316. This provides system developers with the ability to add, modify, and/or remove extensions within the processor extensions 316, even after manufacturing of a computer device.

Accordingly, the processor extensions 316 may be provided whole, or in part, by the HPU instance 314. The processor extensions 316 are preferably configured to allow for the computer device 302, and more specifically physical hardware devices of the computer device 302, to perform direct access operations via the provisioned hardware instances 320. The processor extensions 316 may therefore such direct access via instructions such as ADDVSOCINST and DELVSOCINST, for example. These particular non-limiting example processor extensions may allow, for instance, a system to securely create (provision) and remove (de-provision) hardware instances within the reprogrammable hardware layer 303 at runtime, respectively. As used herein, direct access in the context of processor extensions refers to input/output (IO) that does not pass through an operating system (OS), and instead allows for physical hardware devices to communicate directly with hardware instances consistent with the present disclosure.

Preferably, the HPU instance 314 provisions a hardware instance consistent with the present disclosure within the reprogrammable hardware layer 303. The HPU instance 314 can be provisioned based on an instruction set stored in the memory 306 and/or secure memory device 308, as discussed above.

In one example, the computer device 302 implements the RHDs 318-1 to 318-N as local devices, e.g., co-located in a same computer housing/chassis, rack, or data center. For instance, the RHD device 318-N can be a PCIe card that is electrically coupled to the computer device 302 via a PCIe slot (not shown) provided by the same. In this example, the RHD interface 312 may therefore be at least partially implemented as a PCIe bus. Note, however, that each RHD can be a same or different type of RHD. For instance, the RHD 318-1 can be implemented as a chip that is physically coupled (e.g., soldered) on a motherboard (not shown) of the computer device 302, and the RHD 318-N can be implemented as a PCIe card. Preferably, the RHD interface 312 can logically provide the plurality of RHD devices, e.g., RHD 318-1 to 318-N, as a single logical RHD device. Preferably, this single logical RHD device provides a contiguous address space such that the reprogrammable fabric of each of RHD 318-N to 318-N can be provisioned/reprogrammed as a single RHD device.

In operation, the computer device 302 can receive remote requests from the network 377 by way of NIC 310. The requests can originate from a remote computer device such as remote computer device 390. The remote computer device 390 may also include an optional (local) RHD 319 and a HPU instance (not shown) consistent with aspects of the present disclosure. In one example, the remote computer device 390 has an identical configuration to that of the computer device 302 and preferably includes at least one local RHD device 319. Accordingly, the remote computer device 390 may therefore provide a portion of the reprogrammable fabric available within the reprogrammable hardware layer 303. Preferably, this allows for a scenario where RHDs 318-1 to 318-N and RHD 319 are logically associated and can be accessed as a single RHD device for provisioning of hardware instances consistent with the present disclosure. Accordingly, an RHD-deployed virtual environment could include hardware instances that are deployed/provisioned across different and distinct computer devices, e.g., computer device 302 and remote computer device 390. The computer device 302 may be in a same geographical location as the remote computer device 390, such as the same data center or within the same vehicle, or may be disposed at different geographic locations that are miles or thousands of miles from each other.

The remote computer device 390 may then send a request to the computer device 302. The request may be configured to cause the computer device 302 to perform at least one provisioning action. The at least one provisioning action can include a request to provision a hardware instance within an RHD, de-provision a hardware instance within an RHD, and/or transition a hardware instance to a target state (e.g., startup/initialize, power-on/energize, shutdown/de-energize). The at least one provisioning action can also include input-output (IO) requests such as a read request to determine a value of a register implemented via a RHD, e.g., within reprogrammable fabric or physical hardware associated with the RHD such as a Flash memory chip.

The computer device 302 may then receive the requests from the network 377 and perform a requested action. The computer device 302 can be configured to authenticate requests using, for instance, symmetric encryption or other suitable cryptographic approach. The computer device 302 may then send a response message to each received request, with the response message preferably providing an indication that the request was successful (e.g., via a ACK), or not (e.g, via a NAK), as the case may be. The response message can also include data that represents a requested value, such as a content of a requested memory/LUT within an RHD.

Figure 4:
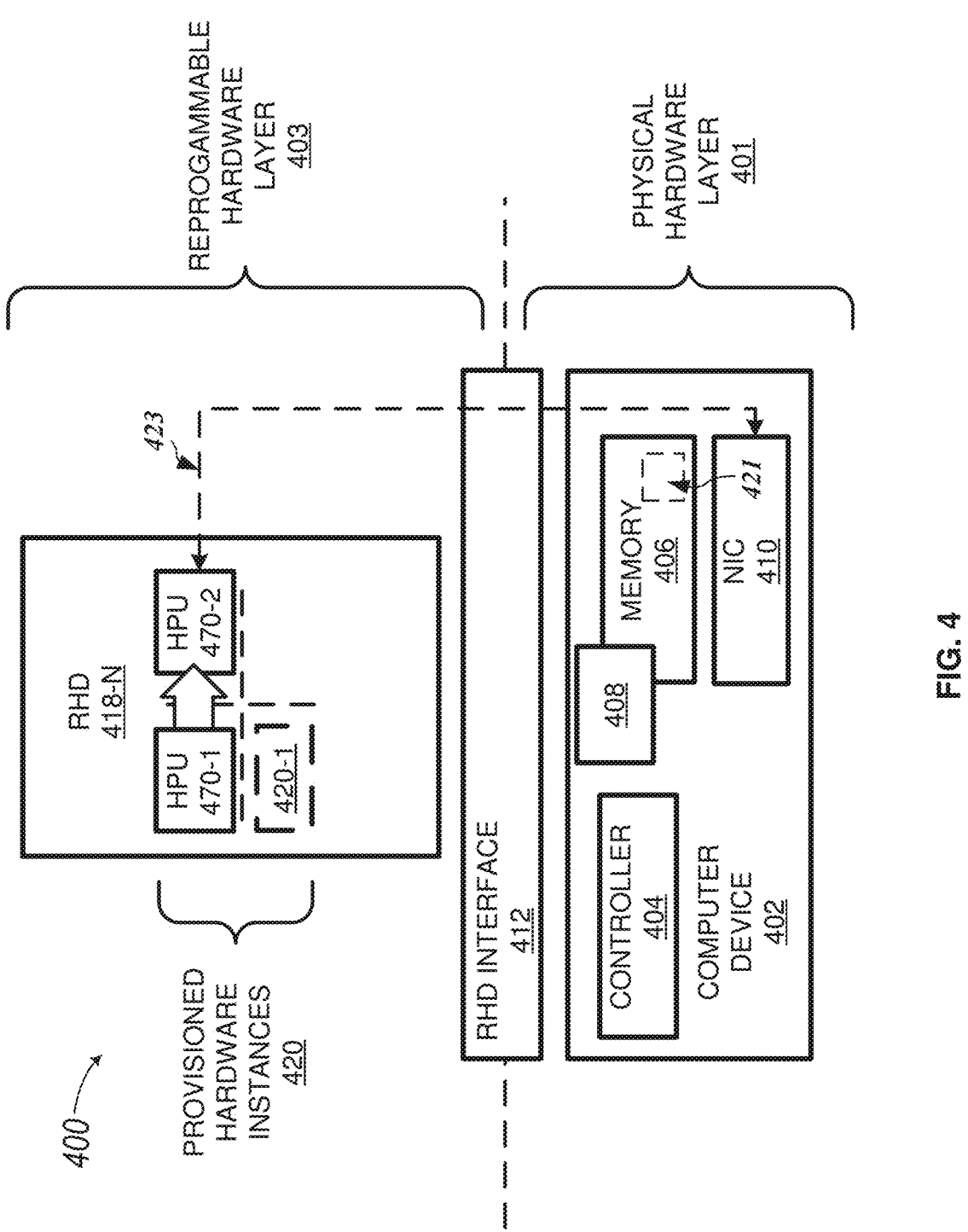
FIG. 4 shows an example system for provisioning a secure hypervisor processing unit (HPU) instance within reprogrammable fabric of an RHD, in accordance with aspects of the present disclosure.

FIG. 4 illustrates an example system 400 consistent with the present disclosure during an initialization/startup sequence. As shown, the system 400 includes a reprogrammable hardware layer 403 that preferably includes at least one RHD, such as RHD 418-N. The physical hardware layer 401 preferably includes at least one computer device, such as computer device 402.

The computer device 402 is preferably implemented with at least one physical hardware device, and more preferably a plurality of physical hardware devices such as a controller 404, a memory 406, and a network interface circuit 410. The computer device 402 further preferably includes a secure memory device 408. The secure memory device 408 can be implemented as a TPM, for example. The computer device 402 can be implemented as the computer device 302 of FIG. 3, the various features and description of which is equally applicable to the computer device 402 and will not be repeated for brevity.

Preferably, a first instruction set 421 is disposed within the memory 406. More preferably, the first instruction set 421 is disposed within the memory 406 in an encrypted form. The secure memory device 408 can include a token/key for decryption of the first instruction set 421. Alternatively, the first instruction set 421 can be stored within the secure memory device 408. The first instruction set 421 can be stored as a file that can include human readable portions, machine-readable portions, or both. In one preferred example, the first instruction set 421 is an FPGA bitstream.

The first instruction set 421 is preferably configured to cause provisioning of an HPU instance within reprogrammable fabric of the RHD 418-N, such as a first HPU instance 470-1. More preferably, the first instruction set 421 is configured to cause provisioning of the HPU instance and a startup sequence for execution by the HPU instance (e.g., when energized/powered-on).

Preferably, the startup sequence for the HPU instance includes a plurality of stages to transition the HPU instance from a startup state/mode to a normal operation mode. The HPU instance preferably executes the plurality of stages as a result of being energized/powered-on following provisioning within the RHD 418-N.

The plurality of stages further preferably includes a validation stage. The validation stage is preferably configured to identify/detect a fault condition within the RHD 418-N and/or a fault condition within the physical hardware devices of the physical hardware layer 401. The startup sequence preferably transitions to an error stage if a fault condition is detected. The error stage can include sending an alert, e.g., via a network, to a remote computer device. Various additional examples of fault conditions that can be detected within the physical hardware layer 401 by an HPU instance consistent with the present disclosure, and various example remedial actions that can be performed/executed by an HPU instance based on detecting such fault conditions are discussed in greater detail below with reference to FIGS. 7A-8B. On the other hand, the startup sequence preferably transitions to a secure instance provisioning mode if no fault condition is detected (and/or no remedial action can rectify the detected fault condition).

In one example, such fault conditions can include a hardware error, a security fault, and/or degraded performance of the first hardware instance. Some example security faults include an attempt by a hardware instance to perform memory access on a restricted memory location, a physical intrusion into a housing associated with physical hardware of a computer device, and/or one or more measured performance parameters indicating irregular activity.

The secure instance provisioning mode preferably includes provisioning an RHD with a secure HPU instance, which may also be referred to herein as a secure orchestrator instance. One such secure HPU instance is shown as 470-2 in FIG. 4.

The secure HPU instance 470-2 is preferably provisioned in a second section/region of the reprogrammable fabric provided by the RHD 418-N. The secure HPU instance 470-2 may also be referred to herein as a second HPU instance. The secure HPU instance 470-2 is preferably provisioned via a second instruction set (not shown), with the second instruction set being different than the first instruction set 421 that provisions the HPU 470-1. The second instruction set may be stored in the memory 406, and more preferably in an encrypted form within the memory 406 and/or within the secure memory device 408. The second instruction set may be received from a remote computer, e.g., via NIC 410 that communicatively couples to a computer network (not shown). Accordingly, the secure instance provisioning stage can include the first HPU instance 470-1 causing the sending of a request to the remote computer via the NIC to receive the second instruction set.

Preferably, secure instance provisioning stage includes executing/energizing the secure HPU instance 470-2. Execution of the HPU instance 470-2 is preferably configured to cause one or more hardware instances consistent with the present disclosure to be provisioned/deployed within the reprogrammable fabric of the RHD 418-N.

Continuing, the startup sequence may then disable the first HPU instance 470-1 following the execution/energizing of the secure HPU instance 470-2. Accordingly, the first HPU instance 470-1 may be referred to herein as an HPU boot loader. This configuration advantageously allows for the first instruction set 421 that provisions the first HPU instance 470-1 to be relatively feature constrained, and have a relatively small overall footprint within the reprogrammable fabric of the RHD 418-N. Likewise, the first instruction set 421 is preferably configured to minimize or otherwise reduce the overall duration of time required to read the same into memory, provision the first HPU instance 470-1 (e.g., using the RHD interface 412), and cause execution of the first HPU instance 470-1. On the other hand, the secure HPU instance 470-2 preferably includes an overall footprint within the reprogrammable fabric of the RHD 418-N that is larger than the overall footprint of the first HPU instance 470-1. More preferably, the secure HPU instance 470-2 implements various features and functionalities disclosed herein that allows for various hardware instance provisioning tasks to be carried out, e.g., dynamically following the energizing of the secure HPU instance 470-2.

The second instruction set that provisions the secure HPU instance 470-2 can be received from a remote location, such as from a remote computer, to ensure that the secure HPU instance 470-2 is of a latest version (e.g., a version with the latest bug fixes, security patches, encryption/security data, and so on). In this example, the first HPU instance 470-1 can determine that a remote computer has an update/newest version of the second instruction set to provision the secure HPU instance. The first HPU instance 470-1 may perform optional validation on the received second instruction set for security and/or error checking purposes. The first HPU instance 470-1 may choose to utilize an existing instruction set stored in a memory to provision the secure HPU instance 470-2, e.g., if validation fails and/or if there is no updated/newest version available. In the event the second instruction set is received from a remote location, the first HPU instance 470-1 may store the received second instruction set in a memory, such as memory 406. This stored second instruction set may be used to provision the secure HPU instance 470-2 in the future, e.g., when the computer device 302 is rebooted.

In operation, the computer device 402 can enter an initial state, such as a power-on state. The power-on state preferably causes at least one physical hardware device such as the controller 404 to be electrically energized. The initial state further preferably causes the controller 404 to receive a first instruction set for provisioning an HPU instance within a first portion of the reprogrammable fabric provided by the RHD 418-N. More preferably, the provisioning of the HPU instance occurs based on a bios-like "hook" that allows for the provisioning to occur before a kernel of the computer device 402 is executed.

As discussed above, the first instruction set 421 preferably provisions the first HPU instance 470-1. The first instruction set 421 further preferably includes a startup sequence for execution by the provisioned HPU instance.

In one preferred example, the controller 404 further preferably causes the provisioning of the HPU instance, e.g., the first HPU instance 470-1, within the reprogrammable fabric of the RHD 418-N based on the first instruction set 421.

Following provisioning, the controller 404 further preferably causes execution of the provisioned HPU instance, and thus by extension, the startup sequence for execution by the HPU instance. The first HPU instance 470-1 then preferably causes the provisioning of the secure HPU instance, e.g., secure HPU instance 470-2, within a second portion of the reprogrammable fabric provided by the RHD 418-N. Next, the first HPU instance 470-1 then causes the secure HPU instance 470-2 to execute/energize. Preferably, the first HPU instance 470-1 remains operational/energized during at least the provisioning of the secure HPU instance 470-2. This can include the RHD 418-N not being reset or otherwise continuing execution of the first HPU instance 470-1. In one example, the first HPU instance 470-1 can avoid the necessity of restarting/rebooting the RHD 418-N to provision/execute the secure HPU instance 470-2 by partitioning the fabric into blocks that can be hot-swapped without interrupting/de-energizing the portion of fabric that implements the first HPU instance 470-1. This capability can include hot-swapping active states for ongoing transactions and activities.

Hot-swapping active states can be implemented in various ways. In one example, the fabric of an RHD can have associated non-volatile storage where dynamic/runtime state can be staged for later recovery. This is analogous to a modern operating system's hibernation feature whereby the software state is saved to persistent storage before the platform powers off and is re-loaded when the hardware reinitializes. In another example the first HPU instance 470-1 may execute internal instruction sequences that adapt or otherwise patch the hardware representation of the secure HPU instance 470-2 within the reprogrammable hardware layer (e.g., via a bitstream) with the current state of the HPU instance 470-1. In another example, the first HPU instance 470-1 may stage or otherwise pre-initialize the secure HPU instance 470-2 and update a shared memory region (e.g., located within or external to the fabric of an RHD) with the current runtime state. In a yet another example, the first HPU instance 470-1 and the secure HPU instance 470-2 can negotiate a real-time (or near real-time) state transfer. Other existing approaches for the hot-swapping of active states, preferably without reboot/reset of an RHD, can be utilized and are within the scope of this disclosure. In any such case, an HPU's active state can be transferred (e.g., hot swapped) to another RHD instance without requiring the deenergizing or resetting the corresponding RHD.

Alternatively, or in addition, this can include the RHD 418-N being provided by at least first and second RHD devices that are separate and distinct from each other. Accordingly, the first RHD may remain energized/operational while the second RHD is provisioned with the secure HPU instance 470-2 and then reset to cause execution/energizing of the same. In any such case, the first HPU instance 470-1 preferably remains energized/operational during at least the provisioning of the secure HPU instance 470-2.

At this stage with the secure HPU instance 470-2 provisioned and executed, the first HPU instance 470-1 may be de-provisioned or otherwise disabled. De-provisioning can include performing, in a sense, garbage collection on a section of the reprogrammable fabric that was used to provision the first HPU instance 470-1. This section of the reprogrammable fabric may then be utilized to implement a hardware instance consistent with the present disclosure during operation/execution of the secure HPU instance 470-2, for example.

Continuing on, executing/energizing the HPU instance 470-2 preferably causes the provisioning of one or more hardware instances within reprogrammable fabric of the RHD 418-N, such as the hardware instance 420-1. Preferably, provisioning of the one or more hardware instances within the reprogrammable fabric of the RHD 418-N includes the secure HPU instance 470-2 remaining operational/energized, and more preferably, includes all of the provisioned hardware instances 420 remaining operational/energized. Thus, the provisioned hardware instances 420, and thus by extension the RHD-deployed virtual environments, can remain operational/energized during the provisioning and execution of additional hardware instances.

Preferably, at least one hardware instance is provisioned within the reprogrammable fabric of the RHD 418-N by the secure HPU instance 470-2 in response to execution of the same (e.g., as a default). More preferably, a plurality of hardware instances are provisioned by the secure HPU instance 470-2 within the reprogrammable fabric of the RHD 418-N.

In either case, the secure HPU instance 470-2 preferably provisions the hardware instance(s) based on a provision template/definition stored within a memory, such as the memory 406. The provision template can be in a human readable format, such as in JavaScript Object Notation (JSON), and define N number of hardware instances to load during execution of the secure HPU instance 470-2 along with an identifier of an instruction set to provision each hardware instance. The identifier of the instruction set can be a string that defines a file path/location for a given instruction set, although other identifiers such as a universal resource identifier (URI) can be utilized.

In one example, a plurality of provisioning templates can be utilized within the system 400. In this example, the plurality of provisioning templates can be stored within the memory 406 of the computer device 402 and/or within a memory of a remote computer device. Each of the provisioning templates can be configured to cause provisioning of same or different hardware instances. In one example, at least one of the plurality of provisioning templates is assigned/associated with the computer device 402. This assignment/association may be predetermined to ensure that the computer device 402 provisions one or more desired/target hardware instances within the constraints of the local RHD device. Two or more computer devices can be assigned same or different provisioning templates to collectively provide the reprogrammable hardware layer 403.

In one specific example, the provisioning template associated with the computer device 402 includes at least a first redundant hardware instance that is an equivalent of a physical hardware device within the computer device 402, such as the controller 404. In the event the physical hardware device becomes degraded or otherwise inoperable, the redundant hardware instance can be provisioned and executed to operate as a replacement, e.g., such as a replacement of the controller 404. Preferably, this "swap" occurs in a so-called hot-swap fashion whereby the redundant hardware instance is provisioned and executed prior to failure/degradation of the associated physical hardware device. Note, in some scenarios this swapping can occur in the event a hardware defect, hardware error, and/or vulnerability is identified in the physical hardware device, such as a susceptibility to side channel attacks. Consider one example scenario where the first version of the physical hardware device has this defect based on the particular circuit/hardware configuration and/or a firmware bug/error/vulnerability. The redundant hardware instance may be provisioned via an instruction set that defines effectively a second version of the same physical hardware device, but for purposes of deployment within the RHD 418-N. This second version can include at least one change to the circuit/hardware configuration relative to the first version, and/or a different firmware relative to the first version. Accordingly, the redundant hardware instance may be provisioned and executed to take over for an associated physical hardware device to resolve the defect/error, and/or eliminate the vulnerability of the first version. In one scenario, two or more of such redundant hardware instances can be included in the provisioning template. Each of the two or more redundant hardware instances can be configured to operate as backups/replacements for an equivalent physical hardware device within the computer device 402.

Likewise, the provisioning template may also be used to replace existing hardware instances within the provisioned hardware instances 420, e.g., to resolve/remove a vulnerability, correct a hardware error/vulnerability, and/or to update firmware to a latest version (for security, improvements such as feature additions, and/or performance reasons) as discussed further below. Preferably, such "updates" to the hardware instances can occur "live" without disrupting or otherwise degrading performance during execution of associated RHD-deployed virtual machine(s).

In addition, and as discussed above, executing the secure HPU instance 470-2 preferably causes a virtual communication channel, e.g., virtual communication channel 322 of FIG. 3, to be formed to allow for communication between one or more provisioned hardware instances 420 and physical hardware device(s) of the computer device 402.

The secure HPU instance 470-2 is further preferably configured to receive a request to provision a hardware instance within the reprogrammable fabric of the RHD 418-N during operation, e.g., following the energizing of the secure HPU instance 470-2. The request can be received from a network (not shown) by way of the NIC 410, and provided to the secure HPU instance 470-2 via a virtual communication channel 423. In this example, the virtual communication channel 423 may also be referred to herein as a virtual management channel. The virtual management channel can be implemented via a processor extension. The processor extension can be provided at least in part by a physical hardware device within the computer device 402 and/or by a hardware instance provisioned within the RHD 418-N.

During operation, the secure HPU instance 470-2 may cause the provisioning of a replacement hardware instance within the reprogrammable fabric of the RHD 418-N. This may occur based on a received request and/or based on detecting an anomaly associated with a hardware instance provisioned within the RHD 418-N. For instance, a hardware error of the RHD 418-N can cause a hardware instance to become inoperable or otherwise degraded. In another example, a new (or second) version of a hardware instance may be desirable to provision in order to resolve a defect and/or vulnerability of a provisioned hardware instance having a first version. For instance, in a scenario where a first hardware instance provisioned in the reprogrammable fabric of the RHD 418-N is equivalent to a first version of physical hardware device, a second hardware instance equivalent to a second version of the physical hardware device may be deployed/provisioned as a replacement to the first hardware instance. Thus, the second version is different than the first version. For instance, the second version can include a firmware that is different than a firmware of the first version of the equivalent physical hardware device, and/or a circuit configuration that is different from a circuit configuration of the first version of the equivalent physical hardware device. The second version may therefore remove at least one of a hardware vulnerability, a firmware vulnerability, a hardware defect, and/or a firmware defect that is present in the first version of the equivalent physical hardware device. Alternatively, or in addition, the second version may improve an operational characteristic relative to the first version such as provide new features/functions, reduce overall power consumption during operation, and/or increase performance through memory access optimizations.

In any such cases, the secure HPU instance 470-2 may be configured to provision a replacement hardware instance and execute/energize the same. The secure HPU instance 470-2 may then disable or de-provision a target hardware instance of the provisioned hardware instances 420 that is to be replaced by the replacement hardware instance, preferably following energizing of the replacement hardware instance. The secure HPU instance 470-2 can reroute a virtual communication channel from the hardware instance that is to be disabled/de-provisioned to the replacement hardware instance. Accordingly, an associated physical hardware device can continue communication with the replacement hardware instance via the rerouted virtual communication channel without necessarily recognizing/identifying that a replacement hardware instance was deployed.

FIG. 5 shows one example process 500 that exemplifies various aspects and features of the present disclosure. The process 500 is preferably executed at least in part by a controller, such as the controller 304/404 of FIGS. 3 and 4. Note, the process 500 can include more or fewer acts, and acts may not necessarily be executed in the particular order shown in FIG. 5.

The process 500 includes energizing 502 a first physical hardware device of a computer system/device. For instance, the first physical hardware device can be the controller 304 of the computer device 302 (See FIG. 3). Energizing the first physical hardware device can be based on powering "on" the computer system and supplying a power signal to the first physical hardware device.

The process 500 further includes causing 504 provisioning of a secure HPU instance in an RHD. The RHD preferably comprises reprogrammable fabric. In one example, the controller causes the provisioning of the secure HPU, and preferably, causes provisioning of the secure HPU based on a first instruction set stored in a memory. The process 500 further includes causing 506 the secure HPU instance to execute a startup sequence and provision a first hardware instance within the reprogrammable fabric of the RHD. Preferably, the startup sequence is defined by the first instruction set. The startup sequence of the secure HPU instance further preferably causes the provisioning of the first hardware instance within the reprogrammable fabric of the RHD. The process 500 further includes providing 508 a virtualized communication channel between the first physical hardware device and the first hardware instance provisioned within the reprogrammable fabric of the RHD. The process 500 can further include receiving 510 a request to provision a second hardware instance in the reprogrammable fabric of the RHD. In one example, the secure HPU instance receives the request and causes the provisioning of the second hardware instance in the reprogrammable fabric of the RHD. The first and second hardware instances can be provisioned using reprogrammable fabric of a same/common physical RHD device, or within reprogrammable fabric of two or more separate and distinct RHD devices.

Preferably, the first hardware instance remains operational during provisioning (and execution) of the second hardware instance in the reprogrammable fabric of the RHD such that the first hardware instance remains in an operational state and in communication with the first physical hardware device when the second hardware instance is provisioned and transitioned to an energized/executed state.

FIG. 6 shows one example process 600 that exemplifies various aspects and features of the present disclosure. The process 600 is preferably executed at least in part by a controller, such as the controller 304/404 of FIGS. 3 and 4. Note, the process 600 can include more or fewer acts, and acts may not necessarily be executed in the particular order shown in FIG. 6.

Process 600 may be utilized to implement act 504 of the process 500 (see FIG. 5). The process 600 includes receiving 602 a first instruction set for provisioning a first HPU instance in the reprogrammable fabric of an RHD. The process 600 further includes causing 604 provisioning and execution of the first HPU instance in the reprogrammable fabric of the RHD. The process 600 further includes receiving 606 a second instruction set for provisioning a secure HPU instance in the RHD. In one example, this includes the first HPU instance receiving the second instruction set from a memory, such as from a TPM. However, the first HPU instance can receive the second instruction set whole, or in part, from other locations such as from a remote computer device via a network. The process 600 further includes causing 608 provisioning and execution of the secure HPU instance, e.g., by the first HPU instance. Provisioning the secure HPU instance can include utilizing reprogrammable fabric that is common/shared with the first HPU instance such that both HPU instances are deployed via a single physical RHD device. However, the first HPU instance can be provisioned on a first RHD device and the secure HPU instance can be provisioned on a second RHD device, with the first and second RHD devices being physically separate and distinct RHD devices.

The process 600 further includes causing 610 a hardware instance to be provisioned in the reprogrammable fabric of the RHD by the secure HPU. The process 600 further includes optionally deprovisioning 612 the first HPU instance from the reprogrammable fabric of the RHD. Preferably, the deprovisioning of the first HPU instance occurs while the secure HPU remains operational/energized. Likewise, the provisioning of the secure HPU instance and/or the first hardware instance occurs while maintaining other hardware instances deployed within the RHD in an energized state, e.g., while maintaining the first HPU instance in an energized state.

Figures 7A, 7B:
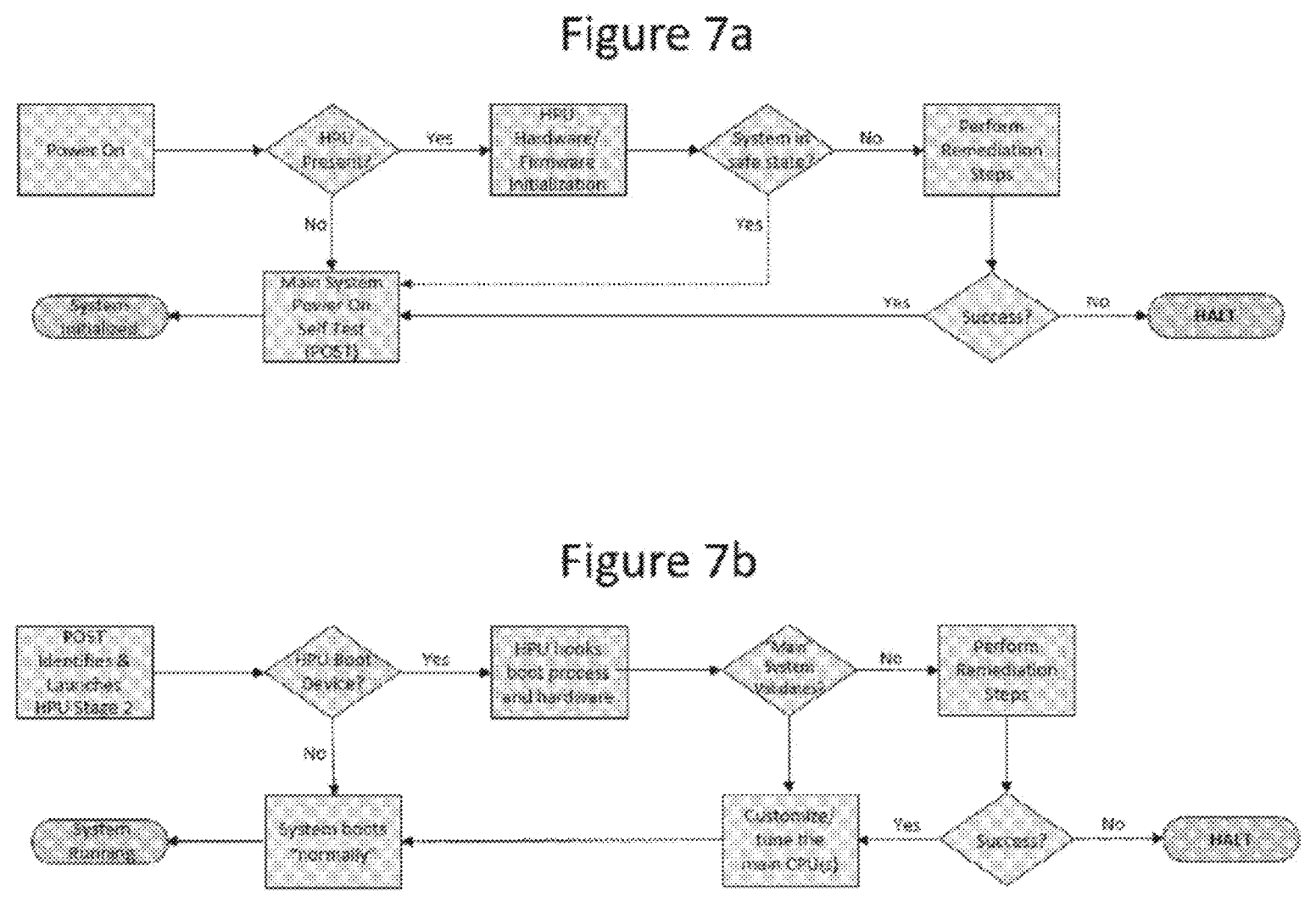

FIGS. 7a and 7b demonstrate how an HPU may work within existing legacy systems. Legacy systems may operate normally without the presence of an HPU but may be subject to HPU security evaluations and protections if one is attached to the system. In one example method, as shown in FIG. 7a, when a legacy system is powered on and an HPU is not present, the system follows its normal behavior and performs a power-on self-test (POST) and the system's peripheral hardware is initialized. It is noted herein that not all possible embodiments require or make use of a POST and these others may have alternate equivalents.

However, as shown in FIG. 7a, if an HPU is present, the HPU initializes and performs validations of the operating environment. If the legacy system is in a safe/valid state the HPU establishes itself as the first (i.e., primary) boot device for the next stage (see FIG. 7b). If not, the HPU attempts remediations of the system. If remediation fails it may halt the system to prevent future compromise. On the other hand, if remediation is successful, the HPU establishes itself as the first boot device for the next stage (FIG. 7b).

FIGS. 7A and 7B show another method that exemplifies aspects of the present disclosure. With reference to FIGS. 7A and 7B, the system's POST and Basic I/O System (BIOS) identify boot devices and attempts to boot the devices. If an HPU was not present in the first stage (see FIG. 7A) then the system boots normally.

However, if an HPU instance is present in the first stage (see FIG. 7A) then the HPU instance "hooks" the boot process and performs additional hardware inspection and bootup validation. If the HPU instance determines the main system, and more specifically the physical hardware devices of the main system, are valid, the HPU may tune various CPU and system state data (e.g., initializes the main CPUs virtualization technology, enables paging and memory access controls, etc.) and may then allow the normal/default boot device to continue the boot process to completion.

However, if there is a condition given rise to an anomaly during the main system validation, the HPU can detect the anomaly and execute one or more remediation actions. If the remediation action(s) are successful, the system is tuned, and then normal/default booting continues. If remediation is unsuccessful, the system may be halted. It is important to note that other corrective actions are possible, including triage or forensics.

Figures 8A, 8B:
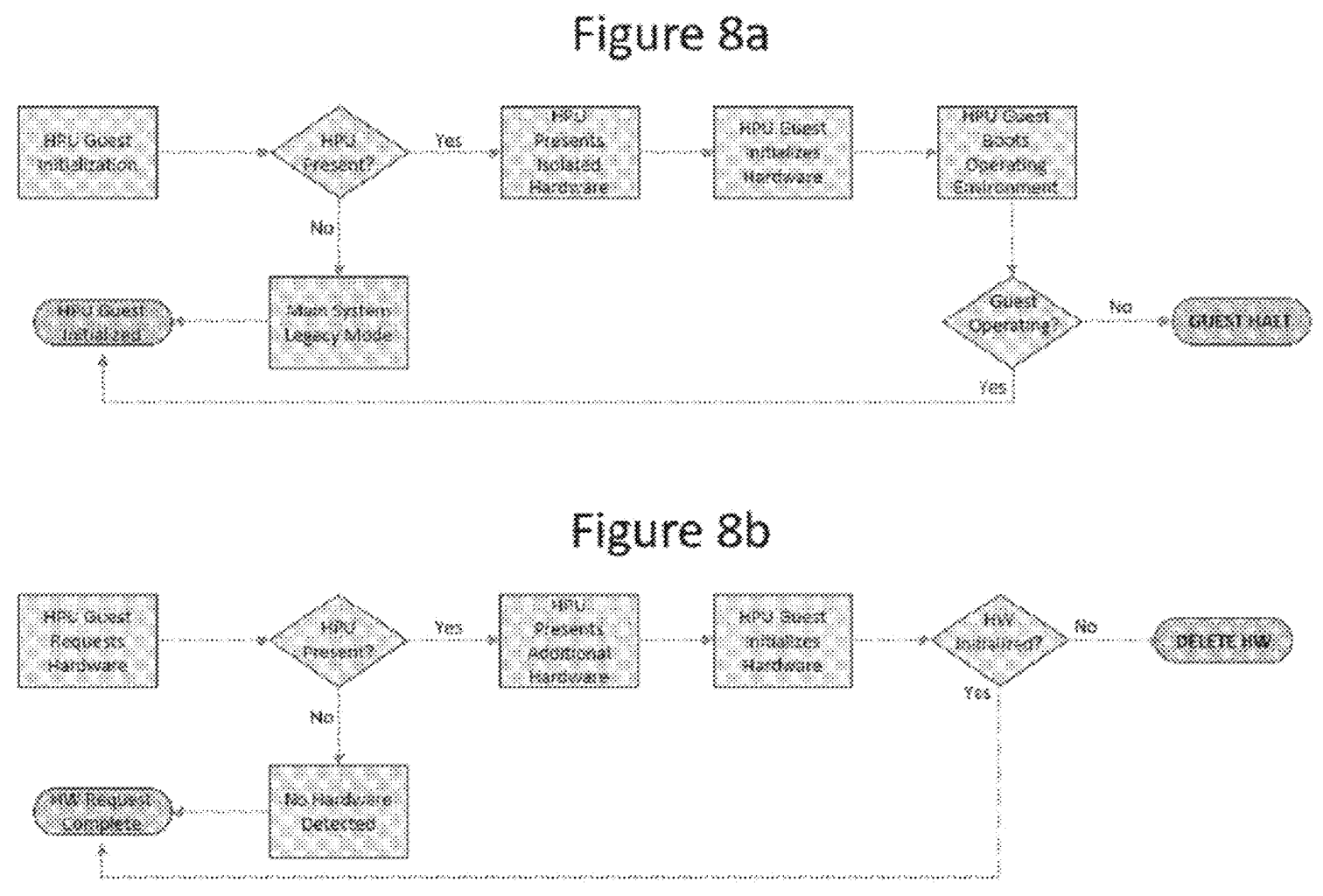

FIGS. 8A and 8B highlight examples of how an HPU consistent with the present disclosure can provide isolated hardware to guests and nested guests (i.e., guests within guests). FIG. 8A continues the boot process from the end of FIG. 7B (i.e., System Running). If an HPU instance is not present, then the main operating system boots normally and has no access to any isolated hardware (e.g., devices within a reprogrammable hardware layer which is also referred to herein as an HPU-protected region). However, if an HPU instance is available, the HPU's guest or nested guest is given access to hardware instances consistent with the present disclosure. These hardware instances can be hard-coded, configured via persistent flash storage, established via configuration files on disk, and/or via any other method of either pre-establishing or on-the-fly selection through any available configuration interface (e.g., console, network, USB keyboard, toggle switches, etc.). Such configuration/ provisioning can be implemented via instruction sets such as FPGA bitstreams. The guest then initializes the hardware presented to it while booting up. If the guest fails, then the HPU may suspend the guest, attempt to reboot the guest, and present alternate hardware instances, or take other action as determined by the system administrator. If the guest successfully completes its initialization and is online, the process then ends.

FIG. 8B extends the concept of presenting dynamically-provisioned hardware to guests by allowing a guest or nested guest to request additional hardware instances or replacement hardware instances after it has energized/booted-up (e.g., has already completed the sequence in FIG. 8A). For instance, in one example a guest may request an additional network interface circuit so that it can act as a network device such as a router. If an HPU instance is present and the request is allowed by policy and available resources, the HPU instance can cause the requested hardware to be provisioned as a hardware instance within reprogrammable fabric of an RHD and made available/accessible to the guest. The guest may then use these hardware-accelerated instantiations without the need of legacy emulated (i.e., software-based) hardware versions.

A first example aspect of the present disclosure is a method for providing a dedicated execution environment, residing outside the context of another processor, wherein the dedicated execution environment establishes a virtual environment based at least in part on one or more hardware instances provisioned within reprogrammable fabric of an RHD. The method comprising monitoring activity within the virtual environment, performing a remediation action in response to detecting a condition giving rise to an abnormal event within the virtual environment, determining the remediation action removed the condition giving rise to the abnormal event, allowing the virtual environment to perform a main system power-on self-test. On the other hand, if the remediation action does not remove the condition, performing a correction action such as suspending a guest can occur.

In the first example, the execution environment can be established within a PCI Express card. In the first example, the execution environment can be established within an M.2. In the first example, the execution environment can be established within a System-on-Chip. In the first example, the execution environment can be established within a System-in-Package. In the first example, the execution environment can be established within a System-on-Board.

In the first example, the method can further include hooking the boot process and performing an inspection of hardware present in the virtual environment (and more preferably, in the virtual environment implemented as an RHD-deployed virtual environment consistent with the present disclosure), validating the hardware in the virtual environment, and in response to determining the hardware is valid, tuning one or more central processor units present in the virtual environment, and in response to determining the hardware is invalid, performing at least one remediation action.

Example 1 is a system for dynamic provisioning of hardware instances within a host computer system via a reconfigurable hardware device (RHD) having reprogrammable fabric, the system comprising a memory having a first instruction set disposed therein, the first instruction set for provisioning an orchestrator instance within the reprogrammable fabric of the RHD and a startup sequence for execution by the orchestrator instance, and wherein the startup sequence of the orchestrator instance is configured to cause provisioning of at least a first hardware instance within the reprogrammable fabric of the RHD and an interface instance to allow for a physical hardware device of the host computer system to communicate with the first hardware instance via a virtualized communication channel.

Example 2 is a system that includes the features of Example 1, wherein the startup sequence of the orchestrator instance includes a plurality of stages to transition the orchestrator instance from a startup mode to a normal operation mode, and wherein the plurality of stages include a validation stage to identify a fault condition within the RHD and/or a physical hardware device of the host computer system.

Example 3 is a system that includes the features of Example 2, wherein the startup sequence is configured to cause provisioning of the first hardware instance based on the orchestrator instance transitioning to the normal operation mode.

Example 4 is a system that includes the features of any one of Examples 1-3, wherein the startup sequence of the orchestrator instance is configured to cause provisioning of a secure orchestrator instance within the reprogrammable fabric of the RHD.

Example 5 is a system that includes the features of Example 4, wherein the orchestrator instance is provisioned within a first portion of the reprogrammable fabric of the RHD and the secure orchestrator instance is provisioned within a second portion of the reprogrammable fabric of the RHD, the first and second portions being different.

Example 6 is a system that includes the features of Example 5, wherein the secure RHD instance is configured to cause the provisioning of the first hardware instance within a third portion of the reprogrammable fabric of the RHD, and wherein the first, second and third portions of the reprogrammable fabric of the RHD are provided by a single RHD device or a plurality of RHD devices.

Example 7 is a system that includes the features of Example 4, wherein the orchestrator instance is configured to cause provisioning of the secure orchestrator instance based on a second instruction set, the second instruction set being different than the first instruction set.

Example 8 is a system that includes the features of Example 4, further comprising a trusted platform module (TPM), and wherein the second instruction set is stored at least partially in the TPM and/or an encryption key associated with the second instruction set is stored in the TPM.

Example 9 is a system that includes the features of Example 7, further comprising a network interface circuit to communicatively couple with a remote computer via a network, and wherein the orchestrator instance is configured to cause provisioning of the secure orchestrator instance based on receiving at least a portion of the second instruction set from the remote computer via the network.

Example 10 is a system that includes the features of any one of Examples 1-9, wherein the first instruction set is a field programmable gate array (FPGA) bitstream and the RHD is an FPGA.

Example 11 is a system that includes the features of any one of Examples 1-10, wherein the startup sequence is further configured to provision at least one processor extension.

Example 12 is a system that includes the features of Example 11, wherein the physical hardware device is a central processing unit (CPU), and wherein the at least one processor extension is configured to allow for the CPU to perform direct read and/or write operations to the first hardware instance.

Example 13 is a system that includes the features of Example 11, wherein the orchestrator instance is configured to provision a plurality of hardware instances within the reprogrammable fabric including the first hardware instance based on provisioning definition stored in the memory.

Example 14 is a system that includes the features of Example 13, wherein the plurality of hardware instances provisioned within the reprogrammable fabric collectively provide one or a plurality of RHD-deployed virtualized environments.

Example 15 is a system that includes the features of Example 13, wherein the orchestrator instance is configured to monitor memory access between the plurality of provisioned hardware instances and detect a memory access anomaly.

Example 16 is a system that includes the features of Example 15, wherein the orchestrator instance is configured to perform a remedial action based on the detected memory access anomaly.

Example 17 is a system that includes the features of Example 16, wherein the remedial action includes preventing a memory access from occurring, executing a built-in instruction provided by a hardware instance provisioned in the reprogrammable fabric, disabling a hardware instance that the detected memory access anomaly originated from, and/or outputting a message to the physical hardware device and/or to a remote computer that includes an identifier of the detected memory access anomaly.

Example 18 is a system that includes the features of any one of Examples 1-17, wherein the orchestrator instance is configured to detect a fault condition of the first hardware instance and perform a remedial action based on the detected fault condition.

Example 19 is a system that includes the features of Example 18, wherein the fault condition is a hardware error, a security fault, and/or degraded performance of the first hardware instance.

Example 20 is a system that includes the features of Example 19, wherein the security fault includes an attempt by the first hardware instance to perform memory access on a restricted memory location, a physical intrusion into a housing associated with the first hardware device, and/or one or more measured performance parameters indicating irregular activity.

Example 21 is a system that includes the features of Example 18, wherein the remedial action includes disabling of the first hardware instance such that communication with the physical hardware device via the virtual communication is prevented and/or provisioning a replacement hardware instance within the reprogrammable fabric of the RHD and rerouting the virtual communication channel to the replacement hardware instance.

Example 22 is a system that includes the features of any one of Examples 1-21, wherein the orchestrator instance is configured to receive a request to provision a hardware instance within the reprogrammable fabric of the RHD, and cause provisioning of the hardware instance within the reprogrammable fabric of the RHD based on the request.

Example 23 is a system that includes the features of Example 22, wherein the orchestrator instance is configured to receive the request from the physical hardware device through a virtual management channel.

Example 24 is a system that includes the features of Example 23, wherein the virtual management channel is implemented via a processor extension, the processor extension being provided at least in part by the physical hardware device and/or by a hardware instance provisioned within the reprogrammable fabric of the RHD.

Example 25 is a system that includes the features of any one of Examples 1-24, wherein the startup sequence is configured to cause provisioning of the first hardware instance within the reprogrammable fabric and to transition the first hardware instance to an energized state, the energized state allowing the first hardware instance to communicate with the physical hardware device via the virtual communication channel.

Example 26 is a system that includes the features of any one of Examples 1-25, wherein the orchestrator instance is configured to cause provisioning of a second hardware instance, and wherein the second hardware instance is provisioned and transitioned to an energized state without resetting the RHD such that the first hardware instance remains in an operational state and in communication with the first physical hardware device via the virtual communication channel when the second hardware instance is provisioned and transitioned to the energized state.

Example 27 is a system that includes the features of any one of Examples 1-26, wherein the second hardware instance is a replacement hardware instance for the first hardware instance.

Example 28 is a system that includes the features of Example 27, wherein the first hardware instance provides a first version of a physical hardware device when the first hardware instance is provisioned within the reprogrammable fabric of the RHD, and wherein the second hardware instance provides a second version of the physical hardware device when the second hardware instance is provisioned within the reprogrammable fabric of the RHD, the second version of the physical hardware device being different than the first version of the physical hardware device.

Example 29 is a system that includes the features of Example 28, wherein the second version of the physical hardware device includes a firmware that is different from a firmware of the first version of the physical hardware device, and/or a circuit configuration that is different from a circuit configuration of the first version of the physical hardware device.

Example 30 is a system that includes the features of Example 29, wherein the second version of the physical hardware device includes at least one change relative to the first version of the physical hardware device that removes at least one of a hardware vulnerability, a firmware vulnerability, a hardware defect, and/or a firmware defect that is present in the first version of the physical hardware device.

Example 31 is a method for dynamic provisioning of hardware instances within a computer device via a reconfigurable hardware device (RHD), the RHD having reprogrammable fabric, the method comprising receiving, by a controller, a first instruction set for provisioning an orchestrator instance within the reprogrammable fabric of the RHD and a startup sequence for execution by the orchestrator instance, causing, by the controller, provisioning of the orchestrator instance within the reprogrammable fabric of the RHD based on the first instruction set, and causing, by the controller, execution of the startup sequence by the orchestrator instance, wherein the startup sequence causes provisioning of at least a first hardware instance within the reprogrammable fabric of the RHD and an interface instance to allow for a physical hardware device of the computer device to communicate with the first hardware instance via a virtualized communication channel.

Example 32 is a method that includes the features of Example 31, wherein executing the startup sequence by the orchestrator instance includes executing a plurality of stages to transition the orchestrator instance from a startup mode to a normal operation mode, and wherein the plurality of stages include a validation stage to identify a fault condition within the RHD and/or a physical hardware device of the computer device.

Example 33 is a method that includes the features of any one of Examples 31-32, wherein executing the startup sequence by the orchestrator instance further causes provisioning of a secure orchestrator instance within the reprogrammable fabric of the RHD.

Example 34 is a method that includes the features of Example 33, wherein provisioning the orchestrator instance further includes provisioning a first portion of the reprogrammable fabric of the RHD, and provisioning the secure orchestrator instance includes provisioning a second portion of the reprogrammable fabric of the RHD, the first and second portions being different.

Example 35 is a method that includes the features of Example 34, wherein provisioning the secure orchestrator instance further includes causing the provisioning of the first hardware instance to occur within a third portion of the reprogrammable fabric of the RHD, and wherein the first, second and third portions of the reprogrammable fabric of the RHD are provided by a single RHD device or a plurality of RHD devices.

Example 36 is a method that includes the features of Example 33, wherein provisioning the secure orchestrator instance by the orchestrator instance further includes receiving at least a portion of a second instruction set via a network from a remote computer and/or from a memory of the computer device, the second instruction set for provisioning the secure orchestrator instance within the reprogrammable fabric of the RHD.

Example 37 is a method that includes the features of any one of Examples 31-36, wherein executing the startup sequence further includes provisioning at least one processor extension.

Example 38 is a method that includes the features of Example 37, wherein the physical hardware device is a central processing unit (CPU), and wherein the method further includes the CPU executing a direct read and/or write operation to the first hardware instance using the at least one processor extension.

Example 39 is a method that includes the features of any one of Examples 31-38, wherein provisioning the first hardware instance by the orchestrator instance further includes provisioning a plurality of hardware instances within the reprogrammable fabric of the RHD including the first hardware instance based on provisioning definition stored in a memory.

Example 40 is a method that includes the features of Example 39, wherein the method further comprises associating the plurality of hardware instances with each other to provide an RHD-deployed virtual environment.

Example 41 is a method that includes the features of Example 40, wherein the method further comprises monitoring, by the orchestrator instance, memory access between the plurality of hardware instances to detect a memory access anomaly.

Example 42 is a method that includes the features of Example 41, wherein the method further comprises executing, by the orchestrator instance, a remedial action based on the detected memory access anomaly.

Example 43 is a method that includes the features of Example 42, wherein executing the remedial action includes at least one of preventing a memory access from occurring, executing a built-in instruction provided by a hardware instance provisioned in the reprogrammable fabric, disabling a hardware instance that the detected memory access anomaly originated from, and/or outputting a message to the physical hardware device and/or to a remote computer that includes an identifier of the detected memory access anomaly.

Example 44 is a method that includes the features of any one of Examples 40-43, wherein the orchestrator instance is configured to detect a fault condition of the first hardware instance and perform a remedial action based on the detected fault condition.

Example 45 is a method that includes the features of Example 44, wherein executing the remedial action by the orchestrator instance includes at least one of disabling of the first hardware instance such that communication with the physical hardware device via the virtual communication is prevented, and/or provisioning a replacement hardware instance within the reprogrammable fabric of the RHD and rerouting the virtual communication channel to the replacement hardware instance.

Example 46 is a method that includes the features of Example 45, further comprising receiving, by the orchestrator instance, a request to provision a hardware instance within the reprogrammable fabric of the RHD, and causing, by the orchestrator instance, provisioning of the hardware instance within the reprogrammable fabric of the RHD based on the request.

Example 47 is a method that includes the features of any one of Examples 31-46, wherein executing the startup sequence by the orchestrator instance further includes causing the provisioning of the first hardware instance within the reprogrammable fabric and causing the first hardware instance to transition to an energized state, the energized state allowing the first hardware instance to communicate with the physical hardware device via the virtual communication channel.

Example 48 is a method that includes the features of any one of Examples 31-47, further comprising causing, by the orchestrator instance, provisioning of a second hardware instance within the reprogrammable fabric of the RHD and energizing of the second hardware instance without resetting the RHD such that the first hardware instance remains in an operational state and in communication with the first physical hardware device via the virtual communication channel when the second hardware instance is provisioned and energized.

Example 49 is a method that includes the features of Example 48, further comprising causing, by the orchestrator instance, de-provisioning of the first hardware instance from the reprogrammable fabric of the RHD after energizing of the second hardware instance.

Example 50 is a method that includes the features of Example 49, further comprising causing, by the orchestrator instance, re-routing of the virtual communication channel to the second hardware instance to provide the second hardware instance as a replacement of the first hardware instance.

Example 51 is a method that includes the features of Example 49, further comprising causing, by the orchestrator instance, provisioning of a third hardware instance within the reprogrammable fabric of the RHD, and wherein the third hardware instance is provisioned using a portion of the reprogrammable fabric that was used to provision the first hardware instance.

Example 52 is a method that includes the features of Example 51, wherein provisioning of the third hardware instance is based on an instruction set that is different than the instruction set used to provision the first hardware instance.

Throughout the entirety of the present disclosure, use of the articles "a" and/or "an" and/or "the" to modify a noun may be understood to be used for convenience and to include one, or more than one, of the modified noun, unless otherwise specifically stated. The terms "comprising", "including" and "having" are intended to be inclusive and mean that there may be additional elements other than the listed elements.

The foregoing description of example aspects has been presented for the purposes of illustration and description. It is not intended to be exhaustive or to limit the present disclosure to the precise forms disclosed. Many modifications and variations are possible in light of this disclosure.

It is intended that the scope of the present disclosure be limited not by this detailed description, but rather by the claims appended hereto. Future filed applications claiming priority to this application may claim the disclosed subject matter in a different manner, and may generally include any set of one or more limitations as variously disclosed or otherwise demonstrated herein.

What is claimed is:

1. A system for dynamic provisioning of hardware instances within a host computer system via a reconfigurable hardware device (RHD) having reprogrammable fabric, the system comprising:

a memory having a first instruction set disposed therein, the first instruction set for provisioning an orchestrator instance within the reprogrammable fabric of the RHD and a startup sequence for execution by the orchestrator instance, wherein the startup sequence of the orchestrator instance is configured to cause provisioning of at least a first hardware instance within the reprogrammable fabric of the RHD and an interface instance to allow for a physical hardware device of the host computer system to communicate with the first hardware instance via a virtualized communication channel, and wherein the startup sequence of the orchestrator instance includes a plurality of stages to transition the orchestrator instance from a startup mode to a normal operation mode, and wherein the plurality of stages include a validation stage to identify a fault condition within the RHD, or a physical hardware device of the host computer system, or both of the RHD and the physical hardware device of the host computer system.

2. The system of claim 1, wherein the startup sequence is configured to cause provisioning of the first hardware instance based on the orchestrator instance transitioning to the normal operation mode.

3. The system of claim 1, wherein the startup sequence of the orchestrator instance is configured to cause provisioning of a secure orchestrator instance within the reprogrammable fabric of the RHD.

4. The system of claim 1, wherein the first instruction set is a field programmable gate array (FPGA) bitstream and the RHD is an FPGA.

5. A system for dynamic provisioning of hardware instances within a host computer system via a reconfigurable hardware device (RHD) having reprogrammable fabric, the system comprising:

a memory having a first instruction set disposed therein, the first instruction set for provisioning an orchestrator instance within the reprogrammable fabric of the RHD and a startup sequence for execution by the orchestrator instance, wherein the startup sequence of the orchestrator instance is configured to cause provisioning of at least a first hardware instance within the reprogrammable fabric of the RHD and an interface instance to allow for a physical hardware device of the host computer system to communicate with the first hardware instance via a virtualized communication channel, wherein the startup sequence of the orchestrator instance is configured to cause provisioning of a secure orchestrator instance within the reprogrammable fabric of the RHD, and wherein the orchestrator instance is provisioned within a first portion of the reprogrammable fabric of the RHD and the secure orchestrator instance is provisioned within a second portion of the reprogrammable fabric of the RHD, the first and second portions being different.

6. The system of claim 5, wherein the secure orchestrator instance is configured to cause the provisioning of the first hardware instance within a third portion of the reprogrammable fabric of the RHD, and wherein the first, second and third portions of the reprogrammable fabric of the RHD are provided by a single RHD device or a plurality of RHD devices.

7. A system for dynamic provisioning of hardware instances within a host computer system via a reconfigurable hardware device (RHD) having reprogrammable fabric, the system comprising:

a memory having a first instruction set disposed therein, the first instruction set for provisioning an orchestrator instance within the reprogrammable fabric of the RHD and a startup sequence for execution by the orchestrator instance, wherein the startup sequence of the orchestrator instance is configured to cause provisioning of at least a first hardware instance within the reprogrammable fabric of the RHD and an interface instance to allow for a physical hardware device of the host computer system to communicate with the first hardware instance via a virtualized communication channel, wherein the startup sequence of the orchestrator instance is configured to cause provisioning of a secure orchestrator instance within the reprogrammable fabric of the RHD, and wherein the orchestrator instance is configured to cause provisioning of the secure orchestrator instance based on a second instruction set, the second instruction set being different than the first instruction set.

8. The system of claim 7, further comprising a trusted platform module (TPM), and wherein the second instruction set is stored at least partially in the TPM, or an encryption key associated with the second instruction set is stored in the TPM, or both the second instruction set is stored at least partially in the TPM and the encryption key associated with the second instruction set is stored in the TPM.

9. The system of claim 7, further comprising a network interface circuit to communicatively couple with a remote computer via a network, and wherein the orchestrator instance is configured to cause provisioning of the secure orchestrator instance based on receiving at least a portion of the second instruction set from the remote computer via the network.

10. A method for dynamic provisioning of hardware instances within a computer device via a reconfigurable hardware device (RHD), the RHD having reprogrammable fabric, the method comprising:

receiving, by a controller, a first instruction set for provisioning an orchestrator instance within the reprogrammable fabric of the RHD and a startup sequence for execution by the orchestrator instance;

causing, by the controller, provisioning of the orchestrator instance within the reprogrammable fabric of the RHD based on the first instruction set; and causing, by the controller, execution of the startup sequence by the orchestrator instance, wherein the startup sequence causes provisioning of at least a first hardware instance within the reprogrammable fabric of the RHD and an interface instance to allow for a physical hardware device of the computer device to communicate with the first hardware instance via a virtualized communication channel, wherein executing the startup sequence by the orchestrator instance includes executing a plurality of stages to transition the orchestrator instance from a startup mode to a normal operation mode, and wherein the plurality of stages include a validation stage to identify a fault condition within the RHD, or a physical hardware device of the computer device, or both of the RHD and the physical hardware device of the computer device.

11. The method of claim 10, wherein executing the startup sequence by the orchestrator instance further causes provisioning of a secure orchestrator instance within the reprogrammable fabric of the RHD.

12. The method of claim 10, wherein executing the startup sequence further includes provisioning at least one processor extension.

13. The method of claim 12, wherein the physical hardware device is a central processing unit (CPU), and wherein the method further includes the CPU executing a direct read operation, or a write operation to the first hardware instance, or both the direct read operation and the write operation to the first hardware instance using the at least one processor extension.

14. The method of claim 10, wherein provisioning the first hardware instance by the orchestrator instance further includes provisioning a plurality of hardware instances within the reprogrammable fabric of the RHD including the first hardware instance based on provisioning definition stored in a memory.

15. The method of claim 14, wherein the method further comprises associating the plurality of hardware instances with each other to provide an RHD-deployed virtual environment.

16. The method of claim 10, wherein executing the startup sequence by the orchestrator instance further includes causing the provisioning of the first hardware instance within the reprogrammable fabric and causing the first hardware instance to transition to an energized state, the energized state allowing the first hardware instance to communicate with the physical hardware device via the virtual communication channel.

17. A method for dynamic provisioning of hardware instances within a computer device via a reconfigurable hardware device (RHD), the RHD having reprogrammable fabric, the method comprising:

receiving, by a controller, a first instruction set for provisioning an orchestrator instance within the reprogrammable fabric of the RHD and a startup sequence for execution by the orchestrator instance;

causing, by the controller, provisioning of the orchestrator instance within the reprogrammable fabric of the RHD based on the first instruction set; and causing, by the controller, execution of the startup sequence by the orchestrator instance, wherein the startup sequence causes provisioning of at least a first hardware instance within the reprogrammable fabric of the RHD and an interface instance to allow for a physical hardware device of the computer device to communicate with the first hardware instance via a virtualized communication channel, wherein executing the startup sequence by the orchestrator instance further causes provisioning of a secure orchestrator instance within the reprogrammable fabric of the RHD, and wherein provisioning the orchestrator instance further includes provisioning a first portion of the reprogrammable fabric of the RHD, and provisioning the secure orchestrator instance includes provisioning a second portion of the reprogrammable fabric of the RHD, the first and second portions being different.

18. The method of claim 17, wherein provisioning the secure orchestrator instance further includes causing the provisioning of the first hardware instance to occur within a third portion of the reprogrammable fabric of the RHD, and wherein the first, second and third portions of the reprogrammable fabric of the RHD are provided by a single RHD device or a plurality of RHD devices.

19. A method for dynamic provisioning of hardware instances within a computer device via a reconfigurable hardware device (RHD), the RHD having reprogrammable fabric, the method comprising:

receiving, by a controller, a first instruction set for provisioning an orchestrator instance within the reprogrammable fabric of the RHD and a startup sequence for execution by the orchestrator instance;

causing, by the controller, provisioning of the orchestrator instance within the reprogrammable fabric of the RHD based on the first instruction set; and causing, by the controller, execution of the startup sequence by the orchestrator instance, wherein the startup sequence causes provisioning of at least a first hardware instance within the reprogrammable fabric of the RHD and an interface instance to allow for a physical hardware device of the computer device to communicate with the first hardware instance via a virtualized communication channel, wherein executing the startup sequence by the orchestrator instance further causes provisioning of a secure orchestrator instance within the reprogrammable fabric of the RHD, and wherein provisioning the secure orchestrator instance by the orchestrator instance further includes receiving at least a portion of a second instruction set via a network from a remote computer, or from a memory of the computer device, or from both the remote computer and the memory of the computer device, the second instruction set for provisioning the secure orchestrator instance within the reprogrammable fabric of the RHD.

20. A method for dynamic provisioning of hardware instances within a computer device via a reconfigurable hardware device (RHD), the RHD having reprogrammable fabric, the method comprising:

receiving, by a controller, a first instruction set for provisioning an orchestrator instance within the reprogrammable fabric of the RHD and a startup sequence for execution by the orchestrator instance;

causing, by the controller, provisioning of the orchestrator instance within the reprogrammable fabric of the RHD based on the first instruction set; and causing, by the controller, execution of the startup sequence by the orchestrator instance, wherein the startup sequence causes provisioning of at least a first hardware instance within the reprogrammable fabric of the RHD and an interface instance to allow for a physical hardware device of the computer device to communicate with the first hardware instance via a virtualized communication channel, wherein provisioning the first hardware instance by the orchestrator instance further includes provisioning a plurality of hardware instances within the reprogrammable fabric of the RHD including the first hardware instance based on provisioning definition stored in a memory, wherein the method further comprises associating the plurality of hardware instances with each other to provide an RHD-deployed virtual environment, and wherein the method further comprises monitoring, by the orchestrator instance, memory access between the plurality of hardware instances to detect a memory access anomaly and executing, by the orchestrator instance, a remedial action based on the detected memory access anomaly.

21. The method of claim 20, wherein executing the remedial action includes at least one of preventing a memory access from occurring, executing a built-in instruction provided by a hardware instance provisioned in the reprogrammable fabric, disabling a hardware instance that the detected memory access anomaly originated from, or outputting a message to the physical hardware device or to a remote computer that includes an identifier of the detected memory access anomaly.

22. The method of claim 20, wherein the orchestrator instance is configured to detect a fault condition of the first hardware instance and perform a remedial action based on the detected fault condition.

23. A method for dynamic provisioning of hardware instances within a computer device via a reconfigurable hardware device (RHD), the RHD having reprogrammable fabric, the method comprising:

receiving, by a controller, a first instruction set for provisioning an orchestrator instance within the reprogrammable fabric of the RHD and a startup sequence for execution by the orchestrator instance;

causing, by the controller, provisioning of the orchestrator instance within the reprogrammable fabric of the RHD based on the first instruction set; and causing, by the controller, execution of the startup sequence by the orchestrator instance, wherein the startup sequence causes provisioning of at least a first hardware instance within the reprogrammable fabric of the RHD and an interface instance to allow for a physical hardware device of the computer device to communicate with the first hardware instance via a virtualized communication channel, wherein provisioning the first hardware instance by the orchestrator instance further includes provisioning a plurality of hardware instances within the reprogrammable fabric of the RHD including the first hardware instance based on provisioning definition stored in a memory, wherein the method further comprises associating the plurality of hardware instances with each other to provide an RHD-deployed virtual environment, wherein the orchestrator instance is configured to detect a fault condition of the first hardware instance and perform a remedial action based on the detected fault condition, and wherein executing the remedial action by the orchestrator instance includes disabling of the first hardware instance such that communication with the physical hardware device via the virtual communication is prevented, or provisioning a replacement hardware instance within the reprogrammable fabric of the RHD and rerouting the virtual communication channel to the replacement hardware instance, or both disabling of the first hardware instance such that communication with the physical hardware device via the virtual communication is prevented and rerouting the virtual communication channel to the replacement hardware instance.

24. The method of claim 23, further comprising:

receiving, by the orchestrator instance, a request to provision a hardware instance within the reprogrammable fabric of the RHD; and causing, by the orchestrator instance, provisioning of the hardware instance within the reprogrammable fabric of the RHD based on the request.

25. A method for dynamic provisioning of hardware instances within a computer device via a reconfigurable hardware device (RHD), the RHD having reprogrammable fabric, the method comprising:

receiving, by a controller, a first instruction set for provisioning an orchestrator instance within the reprogrammable fabric of the RHD and a startup sequence for execution by the orchestrator instance;

causing, by the controller, provisioning of the orchestrator instance within the reprogrammable fabric of the RHD based on the first instruction set;

causing, by the controller, execution of the startup sequence by the orchestrator instance, wherein the startup sequence causes provisioning of at least a first hardware instance within the reprogrammable fabric of the RHD and an interface instance to allow for a physical hardware device of the computer device to communicate with the first hardware instance via a virtualized communication channel; and causing, by the orchestrator instance, provisioning of a second hardware instance within the reprogrammable fabric of the RHD and energizing of the second hardware instance without resetting the RHD such that the first hardware instance remains in an operational state and in communication with the first physical hardware device via the virtual communication channel when the second hardware instance is provisioned and energized.

26. The method of claim 25, further comprising causing, by the orchestrator instance, de-provisioning of the first hardware instance from the reprogrammable fabric of the RHD after energizing of the second hardware instance.

27. The method of claim 26, further comprising causing, by the orchestrator instance, re-routing of the virtual communication channel to the second hardware instance to provide the second hardware instance as a replacement of the first hardware instance.

28. The method of claim 26, further comprising causing, by the orchestrator instance, provisioning of a third hardware instance within the reprogrammable fabric of the RHD, and wherein the third hardware instance is provisioned using a portion of the reprogrammable fabric that was used to provision the first hardware instance.

29. The method of claim 28, wherein provisioning of the third hardware instance is based on an instruction set that is different than the instruction set used to provision the first hardware instance.

* * * * *